United States Patent
Shockey et al.

(10) Patent No.: US 6,951,162 B1
(45) Date of Patent: Oct. 4, 2005

(54) PENETRATION-AND FIRE RESISTANT FABRIC MATERIALS AND STRUCTURES

(75) Inventors: Donald A. Shockey, Menlo Park, CA (US); David C. Erlich, Palo Alto, CA (US); Jeffrey W. Simons, Palo Alto, CA (US)

(73) Assignee: SRI International, Menlo Park, CA (US)

(*) Notice: Subject to any disclaimer, the term of this patent is extended or adjusted under 35 U.S.C. 154(b) by 0 days.

(21) Appl. No.: 09/544,357

(22) Filed: Apr. 6, 2000

Related U.S. Application Data

(63) Continuation of application No. 09/325,596, filed on Jun. 2, 1999, now Pat. No. 6,612,217.
(60) Provisional application No. 60/087,771, filed on Jun. 2, 1998.

(51) Int. Cl.⁷ .................................................. B64D 7/00
(52) U.S. Cl. ....................... 89/36.11; 89/36.02; 244/121
(58) Field of Search ............................ 89/36.01, 36.02, 89/36.11; 244/119, 129.1, 123, 121, 125, 126

(56) References Cited

U.S. PATENT DOCUMENTS

| | | | | |
|---|---|---|---|---|
| 3,576,162 A | * | 4/1971 | Lea | 244/121 |
| 3,740,905 A | * | 6/1973 | Adams | 244/119 |
| 3,974,313 A | * | 8/1976 | James | 428/176 |
| 4,291,851 A | * | 9/1981 | Johnson | 244/119 |
| 4,404,889 A | * | 9/1983 | Miguel | 89/36.02 |
| 4,822,657 A | * | 4/1989 | Simpson | 428/69 |
| 5,031,862 A | * | 7/1991 | Rhodes | 244/121 |
| 5,102,723 A | * | 4/1992 | Pepin | 428/223 |
| 5,169,700 A | * | 12/1992 | Meier et al. | 428/921 |
| 5,398,889 A | * | 3/1995 | White et al. | 244/119 |
| 5,472,760 A | * | 12/1995 | Norvell | 244/119 |
| 5,520,132 A | * | 5/1996 | Crippen | 114/72 |
| 5,533,781 A | * | 7/1996 | Williams | 296/204 |
| 5,679,918 A | * | 10/1997 | Korpi et al. | 89/36.08 |
| 5,705,764 A | * | 1/1998 | Schade et al. | 89/36.02 |
| 5,806,796 A | * | 9/1998 | Healey | 244/117 R |
| 6,119,575 A | * | 9/2000 | Dragone et al. | 89/36.05 |

FOREIGN PATENT DOCUMENTS

| | | | | |
|---|---|---|---|---|
| FR | 1054606 | * | 2/1954 | 244/129.1 |
| FR | 2 653 090 | * | 4/1991 | 244/119 |
| JP | 2-37100 | * | 2/1990 | 244/121 |
| JP | 2-183798 | * | 7/1990 | 89/36.02 |

OTHER PUBLICATIONS

English translation of Japan 2–183798; 10 pages.*
DuPont; Kevlar Aramid; Dec. 9; 1982; 428/911; pp. 1–8.*

* cited by examiner

*Primary Examiner*—Stephen M. Johnson
(74) *Attorney, Agent, or Firm*—Perkins Coie LLP

(57) ABSTRACT

A ballistic and/or fire barrier for protecting objects in an interior of a vehicle due to projectile penetration and/or fire includes one or more layers of high strength fabric positioned towards an outer shell of the vehicle. The high strength fabric is substantially fixedly or fixedly positioned with respect to the outer shell of the vehicle. In another embodiment, the ballistic and/or fire barrier protects objects in a structure from damage due to projectile penetration. The ballistic and/or fire barrier includes at least one layer of high strength fabric positioned towards an outer housing of the structure. The high strength fabric is substantially fixedly positioned with respect to the structure towards either the inner or outer surface of the outer housing. In another embodiment of the present invention, a ballistic barrier protects a wearer of the ballistic barrier from damage due to projectile penetration. The ballistic barrier comprises first and second portions positioned generally parallel each other. The first portion includes one or more layers of high strength fabric while the second portion is generally impact-resistant. Preferably, the layer of high strength fabric comprise a plurality of plies. One of the plies can comprise woven fibers. Another of the plies can be a felt. Also preferably, the layer of high strength fabric in the ballistic barrier embodiments comprises a polymer material such as one or more of aramid material, polyethylene material, and polybenzoxazole material.

20 Claims, 20 Drawing Sheets

| TEST NO. | TARGET | | | | AREAL DENSITY (G/CM²) | FS[B]: BEFORE IMPACT | | | FS: AFTER PENETRATION | | | | SPECIFIC ENERGY ABSORBED[C] (J/G/CM²) |
|---|---|---|---|---|---|---|---|---|---|---|---|---|---|
| | MATERIAL(S) | MESH (YARNS/IN.) | THICKNESS PER PLY (IN.) | NO. OF PLIES | | MASS (G) | VELOCITY (M/S) | K.E. (J) | VELOCITY (M/S) | K.E. (J) | K.E. LOST (J) | (%) | |
| 20 | ZYLON | 30X30 | ≈0.006 | 1 | 0.0130 | 25 | 79 | 78 | 61.5 | 47.5 | 30.5 | 39 | 2346 |
| 26 | ZYLON | 30X30 | ≈0.006 | 1 | 0.0130 | 25 | 82.5 | 85 | 63 | 49.5 | 34.5 | 41 | 2654 |
| 23 | ZYLON UHMW POLYETHYLENE FELT | 30X30 | ≈0.006 ≈0.13 | 1 1 | 0.0130 +0.0309 | 25 | 80 | 80 | 35.5[F] | 20[F] | 60 | 75 | 1366 |
| 22 | ZYLON UHMW POLYETHYLENE FELT | 30X30 | ≈0.006 ≈0.13 | 1 2 | 0.0130 +0.0618 | 25 | 82 | 84 | DID NOT PENETRATE[G] | | 84 | 100 | ≥1123 |

[B] FS MEANS FRAGMENT SIMULATOR.

[C] SPECIFIC ENERGY ABSORBED (SEA) IS DEFINED AS ENERGY ABSORBED PER UNIT AREAL DENSITY.

[F] THE IMPACTOR DID NOT PENETRATE THE FELT; HOWEVER, THE IMPACTOR, SURROUNDED BY THE FELT LAYER, COMPLETELY PENETRATED THE FABRIC.

[G] ONLY PARTIAL PENETRATION WAS OBTAINED IN THIS TEST-THE IMPACTOR, SURROUNDED BY THE FELT, REMAINED LODGED IN THE HOLE IN THE FABRIC.

FIG. 2

| TEST NO.[A] | TARGET | | | | AREAL DENSITY (G/CM²) | FS[B]: BEFORE IMPACT | | | FS: AFTER PENETRATION | | | | SPECIFIC ENERGY ABSORBED[C] (J/G/CM²) |
|---|---|---|---|---|---|---|---|---|---|---|---|---|---|
| | MATERIAL(S) | MESH (YARNS/IN.) | THICKNESS PER PLY (IN.) | NO. OF PLIES | | MASS (G) | VELOCITY (M/S) | K.E. (J) | VELOCITY (M/S) | K.E. (J) | K.E. LOST (J) | K.E. LOST (%) | |
| 13 | ZYLON | 45X45 | ≈0.011 | 1 | 0.0219 | 25 | 78 | 76 | 29 | 10.5 | 65.5 | 86 | 2990 |
| 19[D] | ZYLON | 45X45 | ≈0.011 | 2 | 0.0438 | 25 | 113 | 160 | 64 | 51.5 | 108.5 | 68 | 2477 |
| 20 | ZYLON | 30X30 | ≈0.006 | 1 | 0.0130 | 25 | 79 | 78 | 61.5 | 47.5 | 30.5 | 39 | 2346 |
| 26 | ZYLON | 30X30 | ≈0.006 | 1 | 0.0158 | 25 | 82.5 | 85 | 63 | 49.5 | 34.5 | 41 | 2654 |
| 25 | ZYLON | 35X35 | ≈0.0075 | 1 | 0.0185 | 25 | 77.5 | 75 | 59 | 43.5 | 37.5 | 42 | 2373 |
| 24 | ZYLON | 40X40 | ≈0.009 | 1 | 0.0185 | 25 | 79 | 78 | 49.5 | 30.5 | 48.5 | 61 | 2622 |
| 29 | ZYLON | 40X40 | ≈0.009 | 4 | 0.0740 | 96 | 79 | 300 | 27.5 | 36.5 | 263.5 | 88 | 3560 |
| 32 | ZYLON | 40X40 | ≈0.009 | 6 | 0.111 | 96 | 79 | 300 | DID NOT PENETRATE[E] | | 300 | 100 | 2702 |
| 23 | ZYLON UHMW POLYETHYLENE FELT | 30X30 | ≈0.006 ≈0.13 | 1 1 | 0.0130 +0.0309 | 25 | 80 | 80 | 35.5[F] | 20[F] | 60 | 75 | — |
| 22 | ZYLON UHMW POLYETHYLENE FELT | 30X30 | ≈0.006 ≈0.13 | 1 2 | 0.0130 +0.0618 | 25 | 82 | 84 | DID NOT PENETRATE[G] | | 84 | 100 | — |

[A] TESTS 13 AND 19 WERE PERFORMED AND REPORTED DURING THE PREVIOUS REPORTING YEAR.
[B] FRAGMENT SIMULATOR.
[C] SPECIFIC ENERGY ABSORBED (SEA) IS DEFINED AS ENERGY ABSORBED PER UNIT AREAL DENSITY.
[D] DATA FROM THIS TEST ARE QUESTIONABLE DUE TO THE EXCESSIVE PITCH, DEBRIS FROM THE ALUMINUM HONEYCOMB MOMENTUM TRAP TRAVELING AHEAD OF THE IMPACTOR, AND SOME PBO FIBERS FROM THE BACK (22° ORIENTATION LAYER BREAKING AT THE CORNER OF THE CLAMPING ROD, AND THUS LIKELY REDUCING THE ABSORBED KINETIC ENERGY.
[E] THE IMPACTOR PENETRATED ONLY THE FIRST OF THE SIX LAYERS.
[F] THE IMPACTOR DID NOT PENETRATE THE FELT, HOWEVER, THE IMPACTOR, SURROUNDED BY THE FELT LAYER, COMPLETELY PENETRATED THE FABRIC.
[G] ONLY PARTIAL PENETRATION WAS OBTAINED IN THIS TEST-THE IMPACTOR, SURROUNDED BY THE FELT, REMAINED LODGED IN THE HOLE IN THE FABRIC.

FIG. 3

| TEST NO. | VIDEO | TEST DATE (1998) | TARGET MATERIAL FABRIC TYPE (YARN COUNT) | NO. PLIES | AREAL DENSITY (G/CM²) | GRIPPED EDGES[A] ∥ TO WIDTH; NO. YARNS: (IN.) | PENETRATOR TYPE[B] | PENETRATOR ORIENTATION[C] | STROKE RATE (IN./S) | DATA RATE (/MS) | 1ST YARN BREAK STROKE (IN.) | 1ST YARN BREAK LOAD (LB) | FAILURE STROKE[E] (IN.) | MAXIMUM LOAD (LB) | MAXIMUM MODULUS (LB/IN) | YARNS BROKEN (WARP+FILL) | WORK DONE[F] (IN-LB) | WORK DONE[F] (J) | PER BROKEN YARN (J) | SEA[2] (J/G/CM²) |
|---|---|---|---|---|---|---|---|---|---|---|---|---|---|---|---|---|---|---|---|---|
| P-22 | ✓ | 4/23 | ZYLON 35X35 WEAVE | 1 | 0.0158 | 4 W&F 5.0 | 29-G FB | 45° | 0.075 | 10 | 0.488 | 153 | 0.757 | 153 | 742 | 33+38=71 | 42 | 5 | 0.07 | 300 |
| P-23 | ✓ | 4/23 | ZYLON 35X35 WEAVE / ZYLON FELT #2 | 1 / 2 | 0.0158 / 0.0160 | 4 W&F 5.0 NOT GRIPPED | 29-G FB TOTAL AREAL DENSITY = 0.0318 | 45° | 0.075 | 10 | 0.697 | 493 | 1.035 | 634 | 2545 | 35+36=71 | 220 | 25 | 0.35 | 782 |
| P-26 | ✓ | 4/28 | ZYLON 35X35 WEAVE / ZYLON FELT #2 | 1 / 1 | 0.0158 / 0.0080 | 4 W&F 5.0 NOT GRIPPED | 29-G FB TOTAL AREAL DENSITY = 0.0238 | 45° | 0.075 | 10 | 0.672 | 400 | 1.023 | 484 | 1778 | 32+37=69 | 208 | 23 | 0.34 | 987 |
| P-28 | ✓ | 4/29 | ZYLON 35X35 WEAVE | 1 | 0.0158 | 2 F 5.0 | 29-G FB | 45° | 0.075 | 10 | 0.687 | 260 | 1.330 | 277 | 954 | 26+42=68 | 174 | 20 | 0.29 | 1244 |
| P-29 | ✓ | 4/30 | ZYLON 35X35 WEAVE / ZYLON FELT #2 | 1 / 2 | 0.0158 / 0.0160 | 2 F NOT GRIPPED | 29-G FB TOTAL AREAL DENSITY = 0.0318 | 45° | 0.075 | 10 | 0.781 | 398 | ≈2.70 | 506 | 1585 | 2+33=35 | 687 | 78 | 2.22 | 2441 |
| P-30 | ✓ | 5/7 | ZYLON 35X35 WEAVE | 1 | 0.0158 | 2 F 5.0 | ROUNDED FB | 45° | 0.075 | 10 | 0.612 | 214 | 1.232 | 214 | 829 | 29+41=70 | 120 | 14 | 0.19 | 859 |
| P-31 | ✓ | 5/7 | ZYLON 35X35 WEAVE / ZYLON FELT #2 | 1 / 2 | 0.0158 / 0.0160 | 2 F NOT GRIPPED | ROUNDED FB TOTAL AREAL DENSITY = 0.0318 | 45° | 0.075 | 10 | 0.834 | 463 | ≈2.70 | 478 | 1301 | 2+31=33 | 661 | 75 | 2.26 | 2348 |
| P-35 | ✓ | 5/13 | ZYLON 35X35 WEAVE | 1 | 0.0158 | 2 F 5.0 | 29-G FB | 0° | 0.075 | 10 | 0.667 | 288 | 1.051 | 288 | 1127 | 1+53=54 | 106 | 12 | 0.22 | 758 |
| P-36 | ✓ | 5/14 | ZYLON 35X35 WEAVE / ZYLON FELT #2 | 1 / 2 | 0.0158 / 0.0160 | 2 F NOT GRIPPED | 29-G FB TOTAL AREAL DENSITY = 0.0318 | 0° | 0.075 | 10 | 0.764 | 388 | ≈3.4 | 587 | 1773 | | 943 | 107 | | 3350 |
| P-37 | ✓ | 5/20 | ZYLON 35X35 WEAVE | 1 | 0.0158 | 2 F 5.0 | 25-G FS-SH | 0° | 0.075 | 10 | 0.572 | 240 | 0.767 | 269 | 974 | | 81 | 9 | | 579 |
| P-38 | ✓ | 5/20 | ZYLON 35X35 WEAVE / ZYLON FELT #2 | 1 / 2 | 0.0158 / 0.0160 | 2 F NOT GRIPPED | 25-G FS-SH TOTAL AREAL DENSITY = 0.0318 | 0° | 0.075 | 10 | 0.792? | 377? | >2.2 | 532 | 1475 | | 433 | 49 | | 1538 |

[A] W=WARP YARNS; F=FILL YARNS.
[B] FS=FRAGMENT SIMULATOR; FB=FAN BLADE
[C] THE ANGLE BETWEEN THE DIRECTION OF THE WARP YARNS AND THE LONGEST DIMENSION OF THE PENETRATOR'S IMPACT END (e.g., THE BLADE DIRECTION).
[D] TESTS INVOLVE CONSTANT STROKE RATE TO COMPLETE PENETRATION, EXCEPT WHERE MARKED "C" (CYCLICAL LOADING) OR "I" (INTERRUPTED BEFORE FULL PENETRATION).
[E] DATA IS FOR COMPLETE PENETRATION, EXCEPT FOR INTERRUPTED TESTS (MARKED "I"), WHERE DATA IS AT MAXIMUM BEFORE INTERRUPTION.
[F] EQUALS THE AREA UNDER THE LOAD-DEFLECTION CURVE

FIG. 4

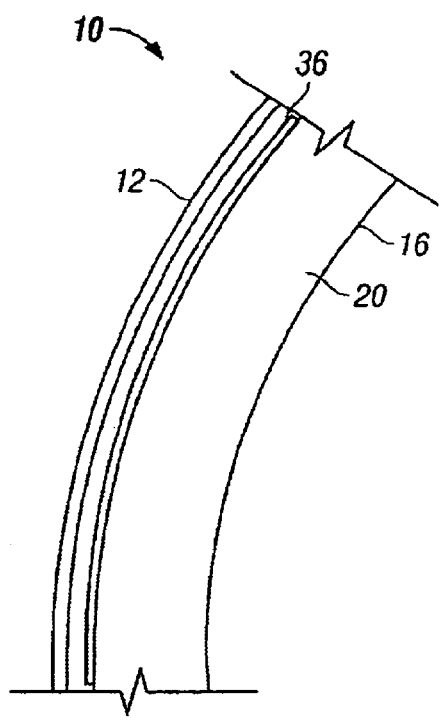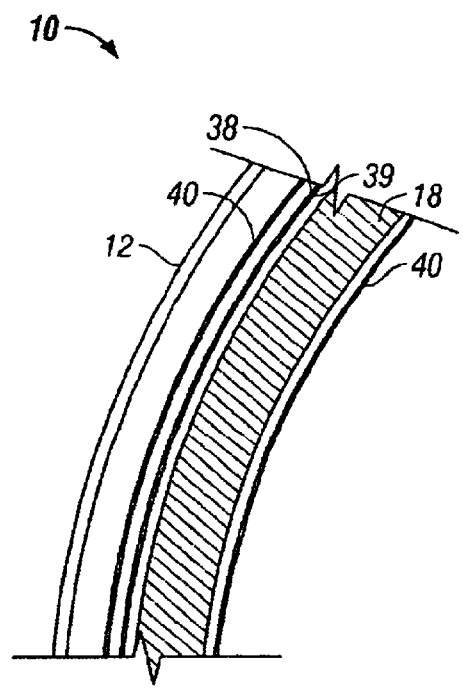
FIG. 15                    FIG. 16

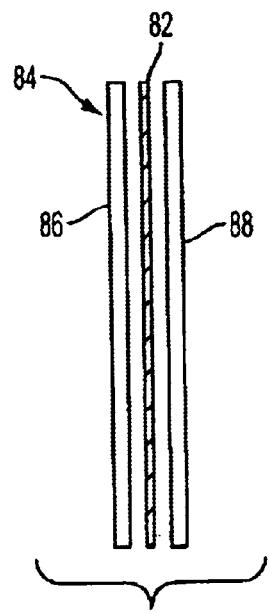
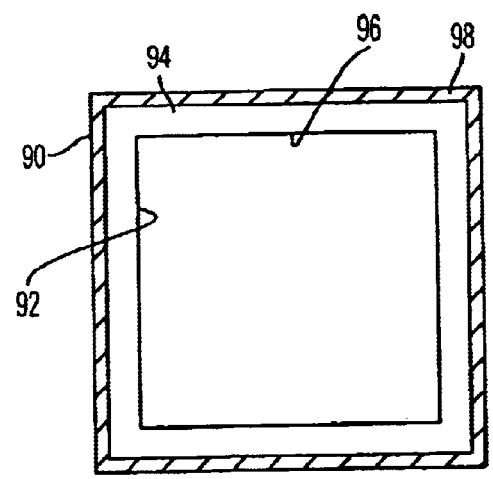
FIG. 23
FIG. 22
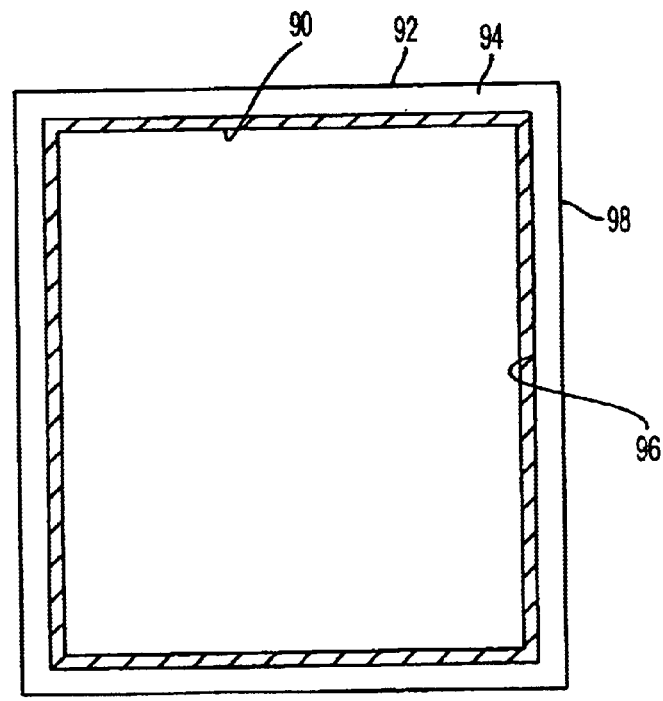
FIG. 24

PENETRATION-AND FIRE RESISTANT FABRIC MATERIALS AND STRUCTURES

CROSS REFERENCE TO RELATED APPLICATIONS

This application claims the benefit of U.S. Provisional Application No. 60/087,771, filed Jun. 2, 1998, and is a continuation of U.S. patent application Ser. No. 09/325,596 entitled Penetration Resistant Fabric Stuctures and Materials filed Jun. 2, 1999, now U.S. Pat. No. 6,612,217 both of which are incorporated herein by reference for all purposes.

U.S. GOVERNMENT RIGHTS

This invention was made in part with government support under research grant number 95-G-010 awarded by the Department of Transportation, Federal Aviation Administration. The government has certain rights in the invention.

BACKGROUND OF THE INVENTION

1. Technical Field

This invention relates generally to fragment penetration and fire shields, and, more particularly, to penetration and bum-through resistant fabric structures and materials used to absorb energy, arrest projectiles, and act as a fire shield.

2. Description of the Related Art

Over the years several civil aircraft accidents having catastrophic consequences have resulted from damage to critical aircraft components by flying engine fragments produced by an in-flight engine failure. Four systems are critical for continued safe operation and landing of an aircraft: the flight control lines, the fuel lines, the engines, and the pressure boundary. The flight control lines and fuel lines, which are separated spatially in the aircraft and redundant, must not be severed by engine fragments. Likewise, second or third engines need to be operational and thus must not be incapacitated by fragments from a failed engine. Finally, compromise of the pressure boundary (holes and tears in the fuselage wall, for example) at typical cruising altitudes could be catastrophic. The desire to provide ballistic protection at minimum weight and cost and to reduce still further the risk of a catastrophic accident from in-flight engine failure requires low weight with high ballistic properties.

Likewise, several civil aircraft incidents having catastrophic consequences have resulted from combustible material used in insulation blankets and the inability of these materials to act as a fireblock and permit time for passengers to evacuate a burning aircraft. Compounding the problem is the fact that most of the objects inside the aircraft, i.e., seats, walls, bins, are polymeric and may burn and/or decompose into flammable gases when exposed to heat.

Materials supporting combustion were blamed for the Swiss Air incident near Nova Scotia and resulted in a directive by the FAA to replace insulation in all aircraft that contained metallized mylar. Another requirement is for a fire blocker that prevents fire outside the aircraft from penetrating into the cabin for a minimum of 5 minutes to allow evacuation of the occupants.

To mitigate damage caused by projectile penetration, many types of barrier systems have been constructed. Steels have traditionally been the material of choice for land vehicle armor. As shown in FIG. 1a, hard steel surfaces produce large stresses in perpendicularly impacting projectiles, blunting the leading edges and/or breaking them into two or more pieces. Further, as illustrated in FIG. 1b, steel surfaces are effective in deflecting projectiles striking the surfaces at an angle. Besides their effectiveness in defeating impacting projectiles, steels are inexpensive relative to other materials and are excellent structurally; being weldable, durable, formable, corrosion resistant, compatible with other structural components, and field repairable. The main drawback of steels is their high density, which results in heavy armor structures and renders them especially unsuitable for use in aircraft.

Ceramics have also been used in the construction of barrier systems. Ceramics make good armor and in many instances outperform conventional rolled homogeneous steel armor. High compressive strength allows ceramics to exert large stresses on high speed impacting projectiles, stresses that act to deform, deflect, and fracture the projectile as shown in FIGS. 1a and 1b, as well as eroding the leading edge of penetrating projectiles and eventually reducing them to particles, as illustrated in FIG. 1c. This is very effective against rapidly moving bullets. However, the ability of ceramics to deform, deflect, fracture, and erode a projectile decreases as the velocity of the projectile decreases, because at low projectile velocities fracture of the ceramics occurs at very early times during traverse of the projectile, thereby increasing the probability that the projectile will succeed in piercing the barrier system.

Polymeric fibers are competitive with metals and superior to ceramics at lower projectile velocities. These fibers deform to absorb the kinetic energy of projectiles striking them, slowing or stopping the projectile. However, polymeric barriers used with aircraft have been primarily positioned within the engine nacelle. However, when a rotor disk bursts, the containment structure may be defeated, allowing debris to be projected outwards in the direction of the fuselage and wings.

Likewise, modern ground transportation continues to evolve towards vehicles of lower and lower weight. Demands for speed and maneuverability as well as fuel efficiency require a light vehicle weight. Conversely, impregnability to projectile penetration traditionally required heavy armor, especially for military vehicles. Thus, a trade off must be reached between maintaining a low enough weight to be practical while ensuring protection of critical components and the safety of the passengers.

SUMMARY OF THE INVENTION

This invention relates to a ballistic and/or fire barrier system. More specifically, one embodiment of the invention provides for low weight, high energy absorbing, fire resistant, multiple function structures and materials for superior ballistic protection against projectiles, from munitions and/or fragments of high speed machine components. Another embodiment of the invention resists burn-through to prevent injury to persons and damage to objects behind the barrier from exposure to flame and heat. Most commonly, it is anticipated that the ballistic and/or fire barrier will be used in combination with aircraft. The ballistic and/or fire barrier may also be used with aircraft luggage and cargo containers; limousines; body armor including helmets; shields for back-of-the-armor debris on battle tanks, personnel carriers; or use on or with any other structure or object where protection against projectiles and/or fire is important.

In one embodiment of the present invention, a ballistic barrier protects objects in an interior of a vehicle, such as a land, air, or sea vehicle, from damage due to projectile penetration. The ballistic barrier includes one or more layers of fabric positioned towards an outer shell of the vehicle. The layer or layers may be disposed in the interior of the vehicle or may be positioned around the outside of the outer shell. The fabric is substantially fixedly or fixedly positioned with respect to the outer shell of the vehicle. If the vehicle includes an inner panel, the layer of fabric can be positioned between the outer shell and inner panel of the vehicle or inside of the inner panel, for example.

As an option, a layer of fabric, alone or in combination with the layer positioned towards the outer shell of the vehicle can be wrapped around at least one component disposed in the interior of the vehicle.

In another embodiment of the present invention, a fire barrier protecting occupants and/or objects in the interior of the vehicle from damage due to heat and contact with flame. The fire barrier has at least one layer of fire resistant fabric disposed in the interior of the vehicle and positioned towards the outer shell of the vehicle. The fire resistant fabric is substantially fixedly positioned with respect to the outer shell of the vehicle.

The layer or layers of fire resistant fabric may comprise a plurality of plies. The layer or layers of fire resistant fabric may also include a fire resistant felt. The layer or layers of fire resistant fabric may comprise a polymer material such as aramid material and/or polybenzoxazole material. One or more layers of either of these two materials may be adequate to resist burn through for the several minutes required for passengers and crew to make an escape from a burning aircraft, particularly in the event of a crash.

In all of the embodiments set forth herein, the fire barrier can be positioned with respect to the recipient object in a similar fashion to the ballistic barrier. Likewise, the fire barrier may be used in conjunction with a ballistic barrier so that both fire resistance and penetration resistance are provided. Furthermore, one layer of fabric, such as one made from aramid material and/or polybenzoxazole material, could provide both fire resistance and penetration resistance.

The vehicle may be primarily designed for military applications, such as the aforementioned tank, for example. Alternatively, the vehicle may be primarily designed for transporting passengers, such as a limousine, armored personnel carrier, etc. The vehicle could also be primarily a cargo vehicle such as a supply truck.

In another embodiment of the present invention, a ballistic barrier protects objects in a structure from damage due to projectile penetration. Such structures include, but are not limited to: buildings; containers such as cargo containers, suitcases, and food containers; etc; or any type of structure capable of partially or fully enclosing an object. The ballistic barrier includes at least one layer of fabric positioned towards an outer housing of the structure. The fabric, which is preferably high strength and/or fire resistant is substantially fixedly positioned with respect to the structure towards either the inner or outer surface of the outer housing. Similarly, a fire barrier may be used to prevent fire and beat damage to objects in a structure.

In yet another embodiment of the present invention, a ballistic barrier protects a wearer of the ballistic barrier from damage due to projectile penetration. to The ballistic barrier comprises first and second portions positioned generally parallel each other. The first portion includes at least one layer of fabric, which is preferably high strength and/or fire resistant, while the second portion is constructed of a hard material such that it fractures, deflects, or slows a projectile. Preferably, the first portion is positioned towards the wearer of the ballistic barrier.

In a further embodiment, a ballistic barrier comprised of one or more layers of fabric positioned in the fuselage wall between the outer metal skin and the interior panels and/or around the turbo engines of commercial or private aircraft to prevent engine fragments from penetrating the aircraft fuselage thereby injuring passengers and/or damaging critical aircraft components. The material is resistant to penetration by projectiles, and is designed to absorb kinetic energy of impacting projectiles to slow or stop them. The fabric, which is preferably high strength and/or fire resistant, is fixedly or substantially fixedly positioned with respect to the fuselage of the aircraft. Such ballistic barriers are more optimal in terms of weight, cost, and ease of installation as well as for removal for aircraft inspections.

The layer of high strength and/or fire resistant fabric may comprise a plurality of plies to achieve a desired measure of ballistic resistance. One of the plies may be a felt. Another of the plies may be comprised of woven fibers. The felt has two ballistic functions: to slow the projectile before it strikes a second ply and blanket the sharp edges of the projectile tip to create a larger and blunter leading edge of the projectile, which makes it more difficult for the projectile to penetrate a second ply.

The fabric of the ballistic barrier may be comprised of woven fibers. At least one layer of the fabric can comprise one or more layers of fabric made from high strength and/or fire resistant polymeric fibers such as aramid, ultrahigh molecular weight polyethylene or polybenzoxazole, or a combination thereof, and, optionally, one or more layers of a felt made from these fibers. The felt may be in contact with the fabric layers, or stand off at a distance. The fabric and/or felt may be encapsulated by a water-tight material to prevent moisture absorption.

The fabric can be made of lightweight polymer fibers configured in one of many types of constructs—2- and 3-dimensional weaves, felts, non-wovens, and lay-ups—either singly or assembled in layers or as laminates, in one of many geometries and fiber mixes, and may include metallic or ceramic or composite materials that are resistant to impact and penetration by projectiles such as fragments or bullets.

The layer of fabric may be positioned at various locations in the fuselage with respect to the components of the fuselage. In one embodiment, the ballistic barrier is coupled to one or more of a plurality of frames of the structure of the fuselage of the aircraft to cover the generally open areas of a frame. Projectiles striking the structural beams of the frame are slowed, stopped, or deflected. The ballistic barrier slows or stops projectiles attempting to pass through the substantially open areas of the frame of the structure.

In another embodiment, at least one layer of the ballistic barrier can be coupled to a layer of insulation positioned between the outer skin and inner panel of the fuselage. Alternatively, at least one layer of the ballistic barrier can be enclosed within an outer covering of the layer of insulation. This configuration prevents moisture from being absorbed by the ballistic barrier.

Protection of particular components of the aircraft may be protected by at least one layer of the ballistic barrier wrapped around the component disposed within the aircraft fuselage.

In an embodiment of the present invention, at least one layer of fabric is positioned towards the outer skin of the aircraft and is fixedly or substantially fixedly positioned with respect to the fuselage of the aircraft. This arrangement has the advantage of protecting components found in the fuselage between the inner panel and the outer skin, such as control lines and the like. Further, a projectile will be slowed considerably before striking the inner panel.

The layer of fabric may be coupled to one or more of the frames of the structure of the fuselage. The layer can also be coupled to a layer of insulation or be enclosed within an outer covering of the layer of insulation. This positioning holds the layer away from the outer skin, preventing moisture from being absorbed by the ballistic barrier and corroding the outer skin.

Again it should be noted that in all of the embodiments set forth herein, the fire barrier can be positioned with respect to the recipient object in the same or similar fashion to the ballistic barrier.

Another embodiment of the present invention is designed to provide local protection to inner components of an aircraft, such as fuel and control lines by deflecting a projectile and/or protecting the components from flame and heat. In such an embodiment, the ballistic barrier is constructed of one or more layers of a high strength material that are oriented at an incline relative to an anticipated line of motion of a projectile to deflect the projectile away from the component. Such a barrier would make use of existing aircraft structure, such as longerons, cargo bay floor, and baggage compartment, for mounting. The high strength material may comprise a laminate of one or more of polymer material, ceramic material, and metal alloy. The polymer material should be positioned such that it will be struck by the projectile after the projectile strikes the ceramic or metal alloy so that the polymer material can absorb the energy of any projectile piercing the ceramic and/or metal alloy layers. If all three materials are used, the ceramic material should be positioned between the polymer material and metal alloy.

BRIEF DESCRIPTION OF THE DRAWINGS

FIG. 2 illustrates the results of a gas gun impact test using targets of a single PBO 30×30 (yarns per inch) mesh weave, tightly gripped on four edges, with and without polyethylene felt.

FIG. 3 illustrates the results of a gas gun impact test using targets of one or more PBO mesh weaves of varying yarns per inch, tightly gripped on four edges, with and without polyethylene felt positioned in front of the weave.

FIG. 4 illustrates the results of a push test of a simulated fan blade and a simulated projectile at varying rates of movement on a single or multiple ply PBO weave with and without one or two plies of PBO felt ungripped and positioned in front of the weave.

FIG. 15 illustrates a positioning of one or more layers of the ballistic and/or fire barrier towards the outer skin of the fuselage of an aircraft and coupled to the structure.

FIG. 16 illustrates a positioning of one or more layers of the ballistic and/or fire barrier within the outer covering of the layer of insulation of the fuselage of an aircraft.

FIG. 22 illustrates a ballistic and/or fire barrier which protects objects (which includes occupants) in an interior of a vehicle from injury or damage due to projectile penetration and/or fire.

FIG. 23 illustrates a ballistic and/or fire barrier that protects objects (including occupants) in a structure from damage or injury due to projectile penetration and/or fire.

FIG. 24 depicts a ballistic and/or fire barrier that protects objects (including occupants) in a structure from injury or damage due to projectile penetration and/or fire.

DESCRIPTION OF THE PREFERRED EMBODIMENTS

Figure 1A:
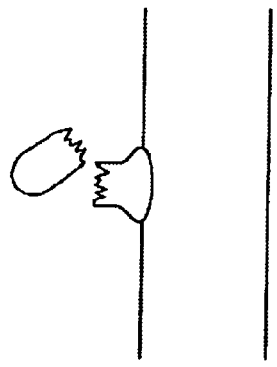
FIGS. 1a, 1b, 1c, and 1d illustrate projectile defeat mechanisms.
Figure 1B:
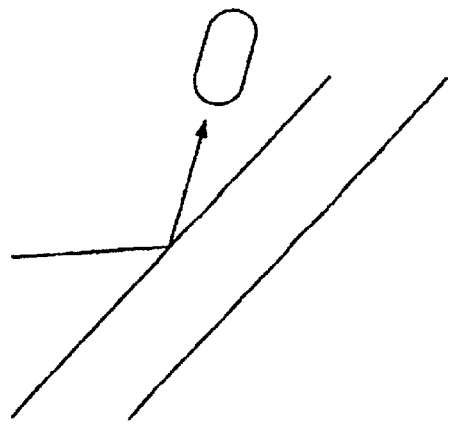
Figure 1C:
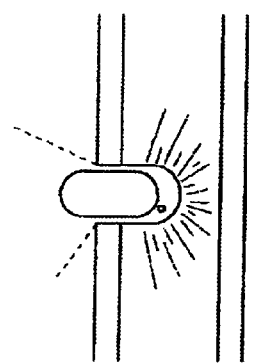
Figure 1D:
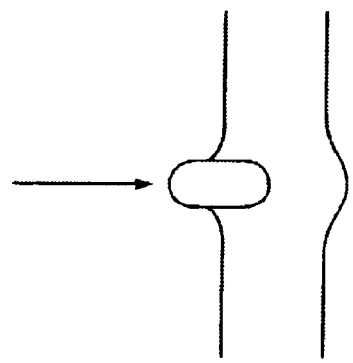
Figure 5:
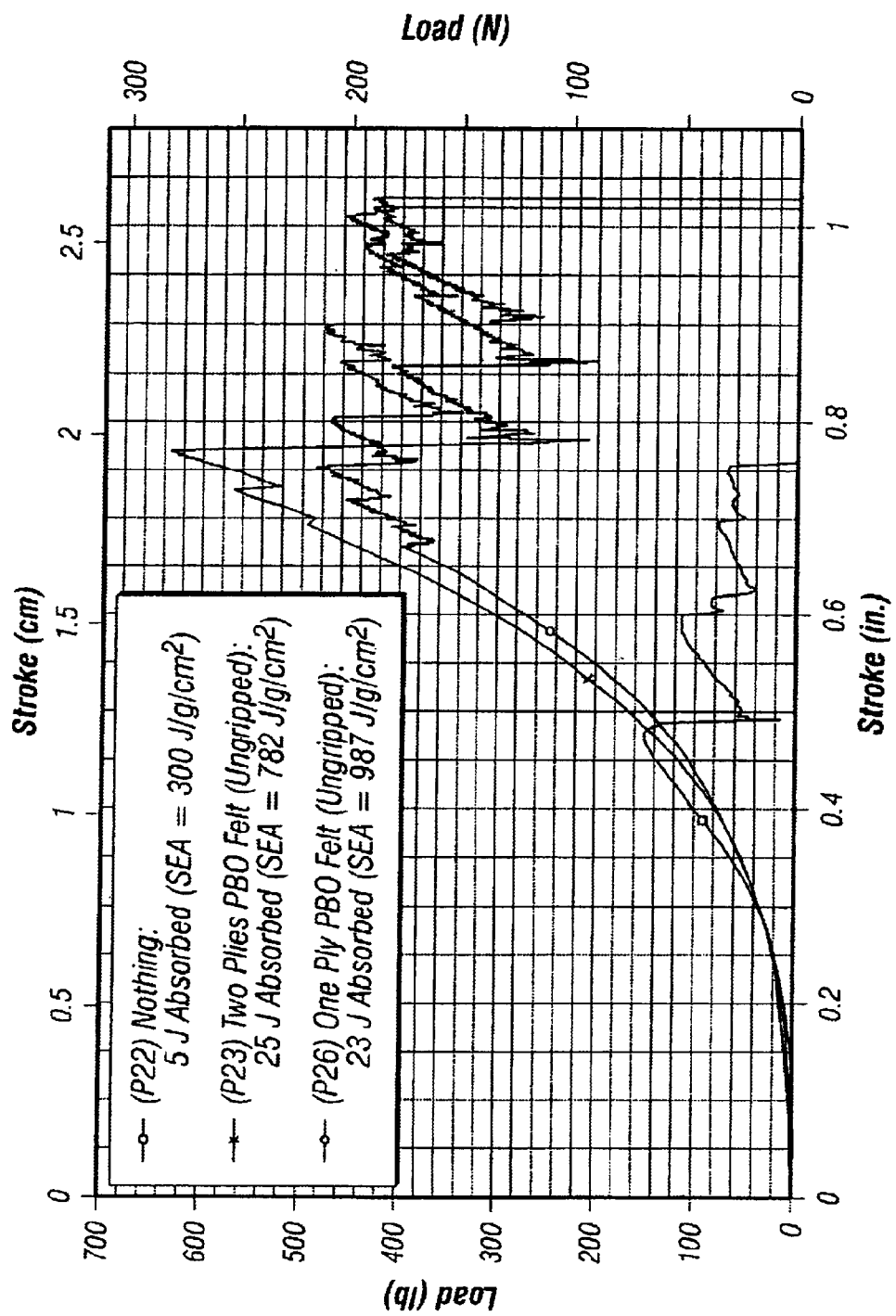
FIG. 5 illustrates the results of push tests of a simulated sharp fan blade at a 45 degree angle of movement and moving at 0.075 in./s on a single ply PBO 35×35 weave gripped on four edges with and without one and two plies of PBO felt ungripped and positioned in front of the weave.
Figure 6:
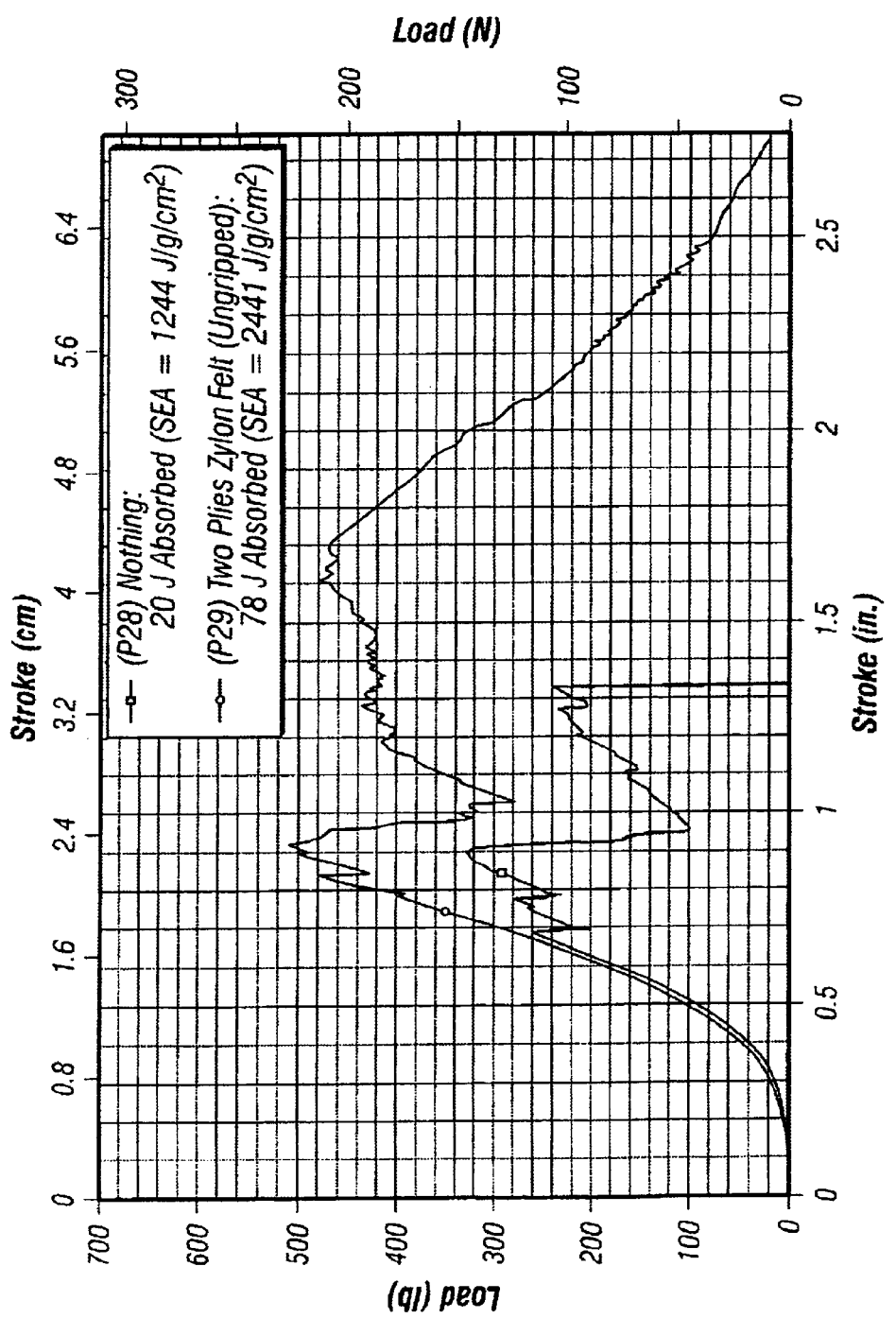
FIG. 6 illustrates the results of push tests of a simulated sharp fan blade at a 45 degree angle of movement and moving at 0.075 in./s on a single ply PBO 35×35 weave gripped on two edges with and without two plies of PBO felt ungripped and positioned in front of the weave.
Figure 7:
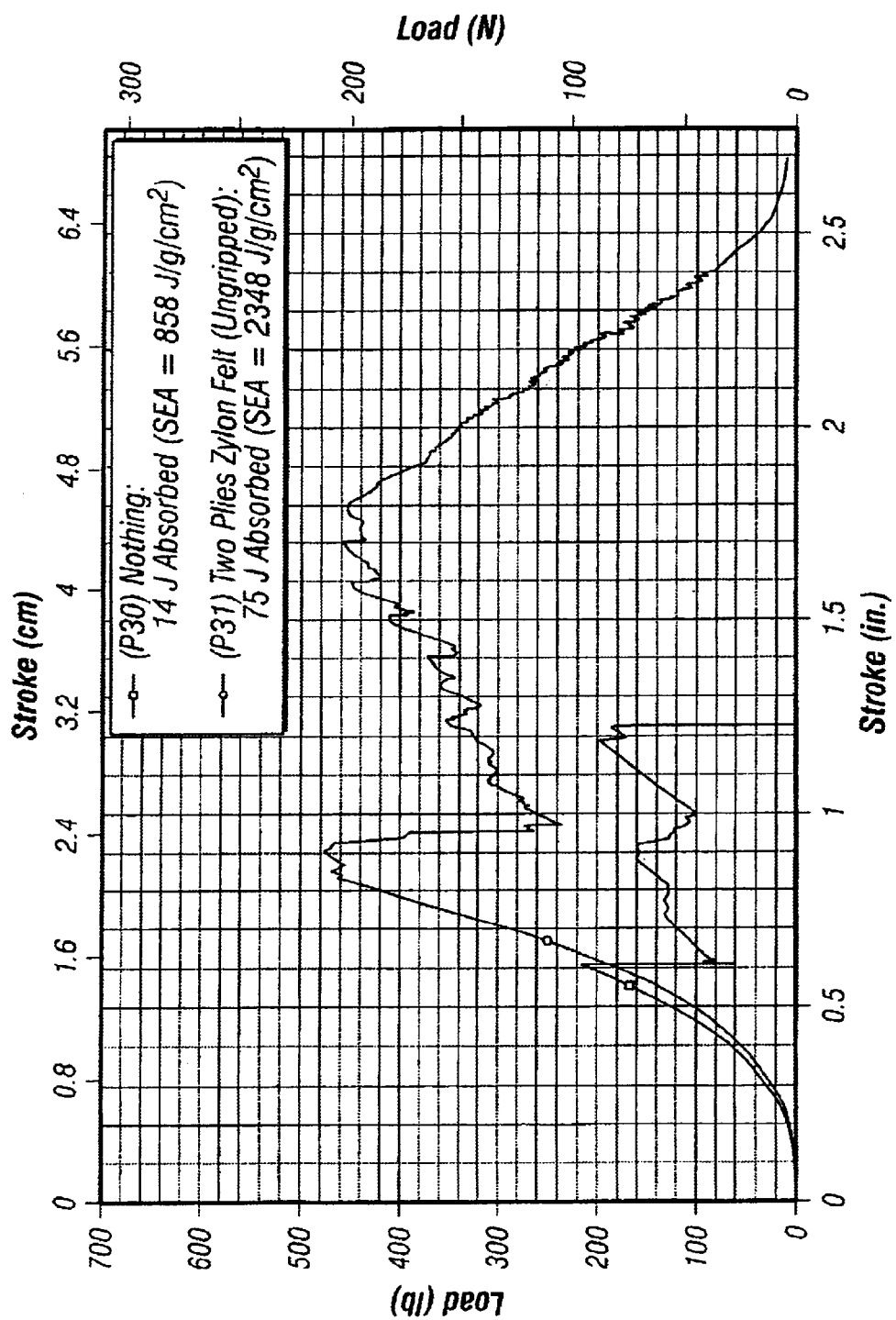
FIG. 7 illustrates the results of push tests of a simulated sharp fan blade at a 45 degree angle of movement and moving at 0.075 in./s on a single ply PBO 35×35 weave gripped on two edges with and without two plies of PBO felt ungripped and positioned in front of the weave.
Figure 8:
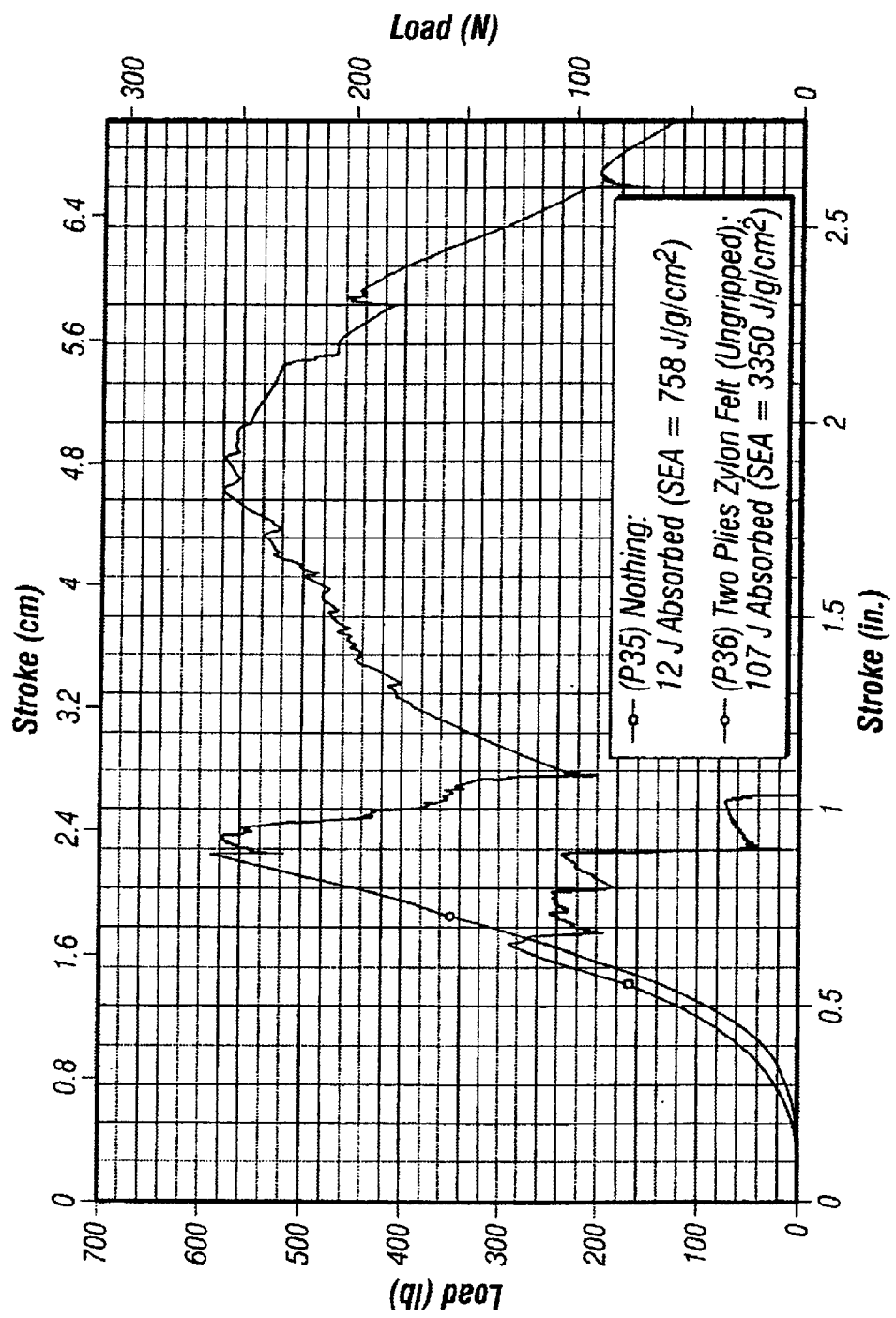
FIG. 8 illustrates the results of push tests of a simulated sharp fan blade at a 0 degree angle of movement and moving at 0.075 in./s on a single ply PBO 35×35 weave gripped on two edges with and without two plies of PBO felt ungripped and positioned in front of the weave.
Figure 9:
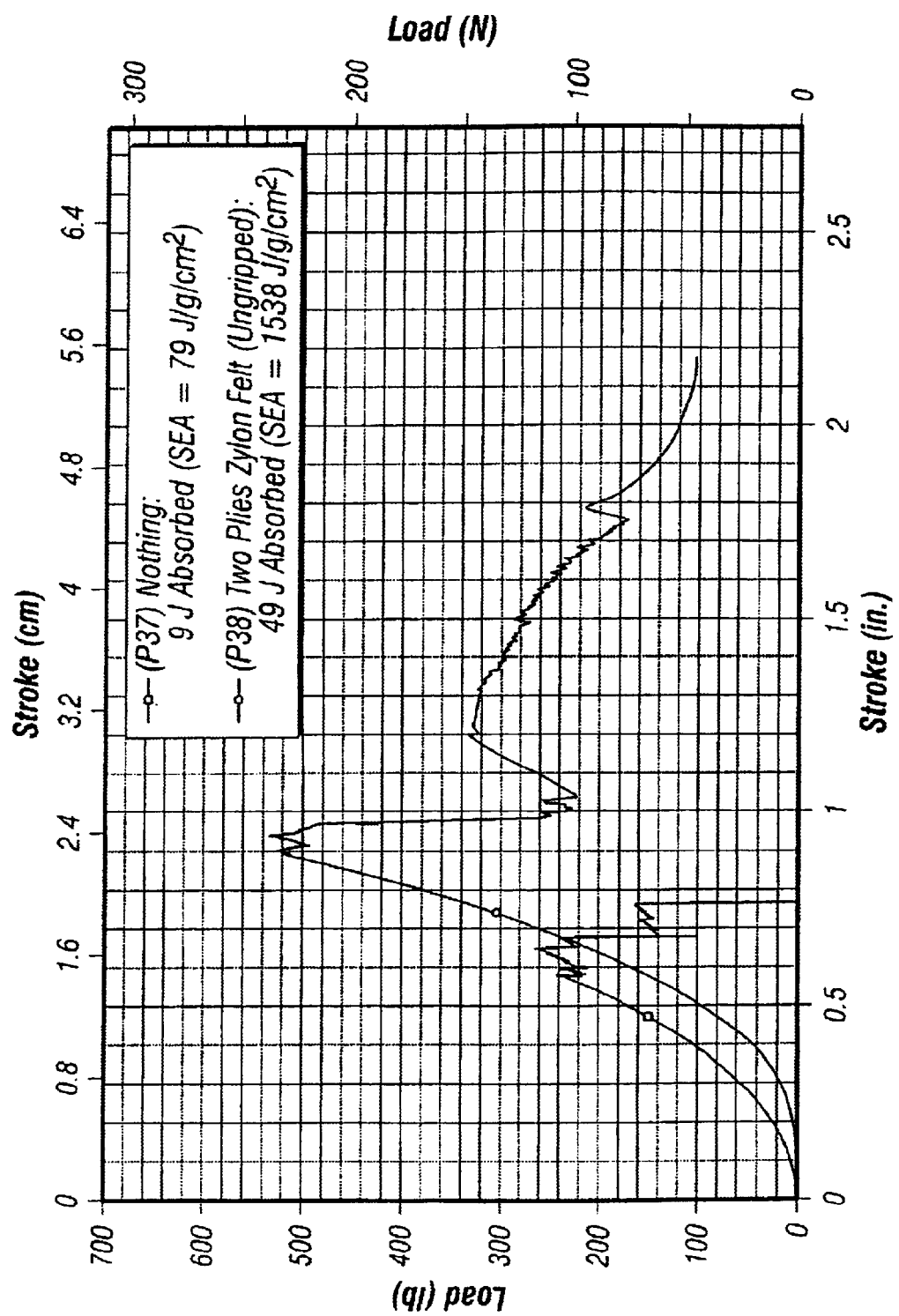
FIG. 9 illustrates the results of push tests of a simulated sharpened fragment at a 0 degree angle of movement and moving at 0.075 in./s on a single ply PBO weave gripped on two edges with and without two plies of PBO felt ungripped and positioned in front of the weave.

The invention includes a low weight, high energy absorbing, fire resistant multiple function barrier for use with vehicles, structures, and other objects for either superior ballistic protection against projectiles, as, for example, from munitions and/or fragments of high speed machine components or protection from fire or protection from both fire and ballistic penetration.

The ballistic and/or fire barrier may be constructed of fabrics and, optionally, felts, of high-strength polymer fibers or other ballistic materials. In particular, highly ordered, highly crystalline, high-molecular-weight polymers, because of their low density and high strength are the preferred materials because of their low overall weight and high penetration resistance to profile ratio. Specifically, fibers of aramid, polyethylene, and phenylenebenzole (PBO) materials provide the most useful measure of ballistic protection in the most weight-efficient manner. Polyethylene has the advantage of low density but is not particularly flame resistant, though could be made to be more flame resistant through application of a flame retardant to the material. Aramid is more flame resistant, but about 50% more dense than polyethylene. PBO is stronger than either aramid or polyethylene, has high flame resistance, and has density comparable to aramid. A combination of two or all of these ballistic materials may be used to produce one or more layers of fabric or felt. Fire resistant felts may have greater thermal resistance than low-profile layers and thus provide the added advantage of providing greater protection from heat.

The above materials can be configured in one of many types of constructs such as 2- and 3-dimensional weaves, felts, non-wovens, and lay-ups—either singly or assembled in layers or as laminates, in one of many geometries and fiber mixes, and may include metallic or ceramic or composite materials that are resistant to impact and penetration by projectiles such as fragments or bullets. The various layers of materials absorb energy from impacting projectiles through frictional resistance as adjacent fibers slide over one another.

Particular selection and positioning of the layers and felt can be manipulated to produce ballistic and/or fire barriers of varying strength and weight. When creating an arrangement including felt and one or more layers of material, the felt should be positioned such that it will be struck by a projectile before the layer or layers are struck. The felt has two ballistic functions: to slow the projectile and blanket the sharp edges of the projectile tip. As the felt engages the projectile and torn from its lateral fasteners, it deforms substantially, absorbs some energy, and slows the fragment. It does not get penetrated and rides with the projectile to present a larger area, blunter leading edge to the next layer. The felt may also impart some rotation on the projectile. The highest strength/lowest weight felts are constructed by blending fibers of aramids, polyethylenes, PBO, and the like, such as by needle punching to enhance the physical interlocking of crosslapped layers. Further strengthening is attainable by thermobonding, i.e., applying pressure and heat so that one fiber melts and creates a unique bond through out the fabric. It should be kept in mind, however, that the use of felt with the layer or layer of fabrics is optional. Additional layers of woven fabric have projectile-resisting effects similar to a felt layer, and in certain instances may be more weight effective.

An example of such a multi-layered barrier structure showing superior protection against penetration by a projectile was achieved by placing one or two sheets of polyethylene felt in contact with a sheet of PBO fabric and impacting a projectile against the layers. The energy required to penetrate the layers is substantially higher in the presence of the felt than for PBO alone. The improvement provided by the felt results from a combination of three factors, namely, the felt blunts the sharp edges of the projectile, increases the effective cross-sectional area of the fragment, and increases the drag of the fragment. Specific properties and characteristics of the barrier structures are obtained by varying the number, order, and thickness of the felt and fabric layers, as well as incorporating other materials into the structure. These parameters can be adjusted to maximize performance against specific projectile threats in specific applications.

The number of layers of material and layers of felt will depend on the anticipated size and velocity of the projectile to be protected against. If it is desired to protect against higher energy fragments, the number of layers can be increased or a multilayer of high strength and/or fire resistant polymer fiber could be used. A fabric is considered high-strength herein if it is able to stop a projectile before rupturing or slow a projectile before rupturing.

FIG. 2 illustrates the results of a gas gun impact test using targets of a single PBO 30×30 (yarns per inch) mesh weave, tightly gripped on four edges, with and without polyethylene felt. The felt was ungripped and positioned in front of the weave. As shown, the use of one ply of felt nearly doubled the amount of kinetic energy lost by the projectile (FS). When the felt was used, the projectile did not penetrate the felt, but completely penetrated the fabric still surrounded by the felt. When two plies of felt were used, the projectile, surrounded by the felt, remained lodged in a hole in the weave.

FIG. 3 illustrates the results of a gas gun impact test using targets of one or more PBO mesh weaves of varying yarns per inch, tightly gripped on four edges, with and without polyethylene felt positioned in front of the weave. The felt was ungripped and positioned in front of the weave. Again it is seen that the use of felt is very effective in slowing or stopping the projectile. In both tests where the felt was used, the projectile did not pierce the felt.

FIG. 4 illustrates the results of a push test of a simulated fan blade (FB) and a simulated projectile (FS) at varying rates of movement on a single or multiple ply PBO weave with and without one or two plies of PBO felt ungripped and positioned in front of the weave. The simulated fan blade and projectile were oriented at varying angles to the weave. The use of felt greatly increased the load required to break a first yarn of the weave. Further, the load which could be handled by the combination of the weave and the felt was much greater than the weave itself.

FIGS. 5 through 9 illustrate the results of push tests of a simulated sharp fan blade or a simulated sharp projectile at various angles of movement on a single ply PBO weave with and without one or two plies of PBO felt ungripped and positioned in front of the weave. As shown, the use of felt greatly increases the distance which a projectile will be allowed to travel before penetrating the weave, as well as increases the load required to penetrate the weave.

Examples of specific anticipated uses of the ballistic and/or fire barrier include, but are not limited to, ballistic and/or fire barriers on aircraft; aircraft luggage and cargo containers; VIP limousines; body armor including helmets; shields for back-of-the-armor debris on battle tanks, personnel carriers; or use on or with any other object where protection against projectiles is important.

Figure 10:
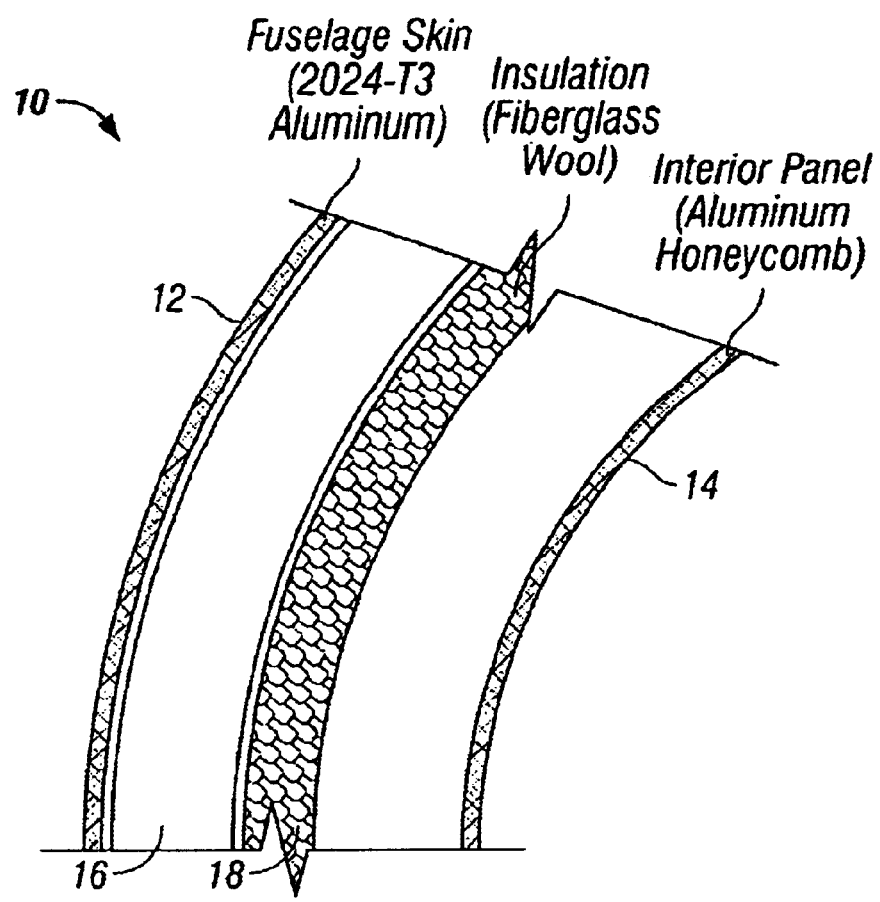
FIG. 10 is an exploded partial cross sectional view of a typical fuselage of an aircraft.

FIG. 10 illustrates a portion of a fuselage 10 of an aircraft that has an outer skin 12, an inner panel 14, a structure 16 positioned between the outer skin and the inner panel, and a layer of insulation 18, which may be positioned between the inner panel and the structure 16 or between the outer skin 12 and the structure 16. Depending on aircraft type, up to 4 to 5 inches of space exists between the outer skin 12 and the inner panel 14 of the fuselage 10. The structure 16 may have a plurality of frames 20 coupled together to form the overall structure 16. See FIG. 11. Together, the frames create a grid of thicker, more fragment-resistant metallic structural beams 22 encompassing roughly 9 by 20 inch generally open areas. In these generally open areas, only the outer skin 12, the layer of insulation 18, and the inner panel 14 are in the path of an engine fragment. These areas offer little resistance to penetration from fragments and any critical component behind the area would be impacted with nearly the entire energy of the fragment.

Figure 11:
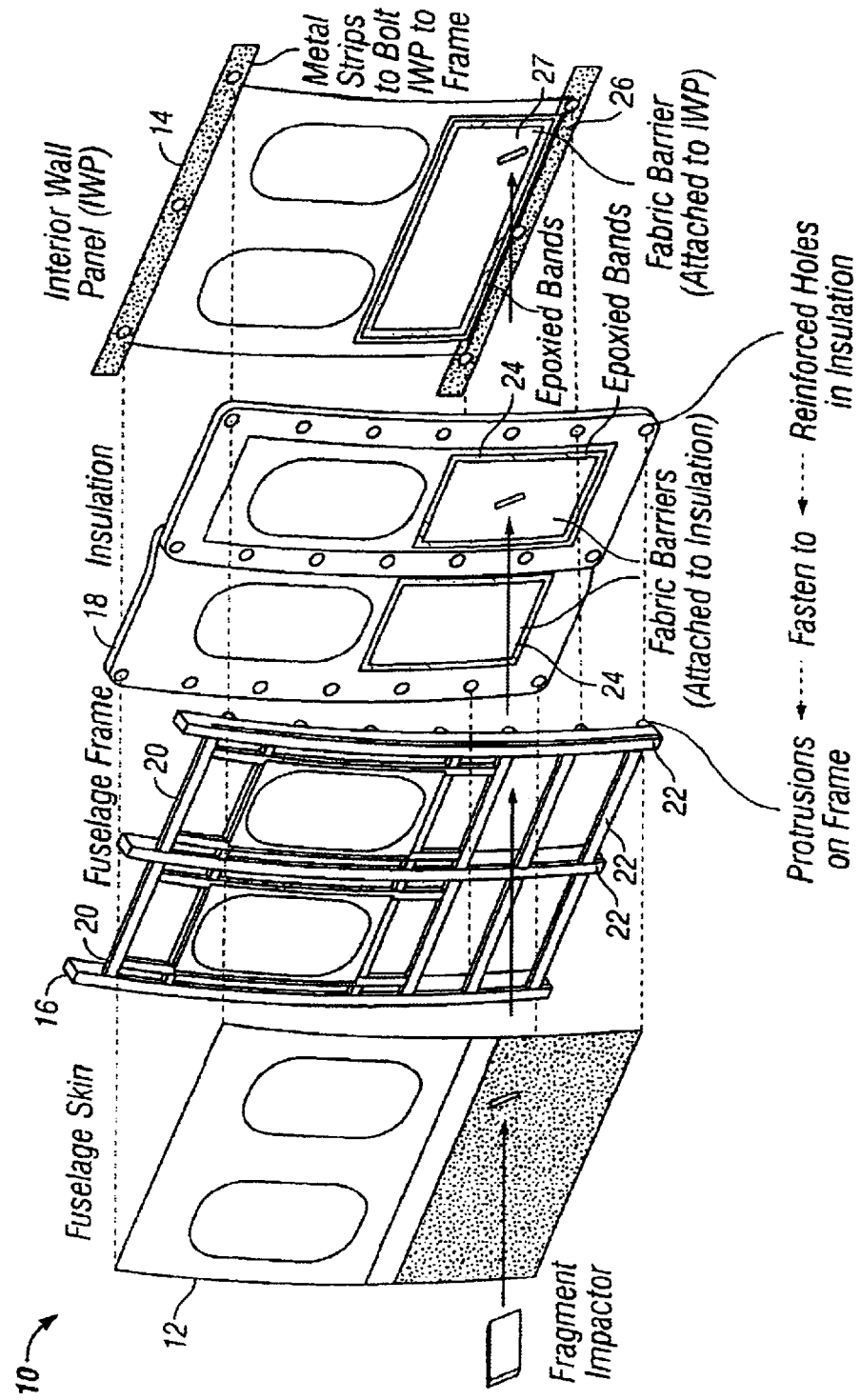
FIG. 11 illustrates a positioning of several layers of the ballistic and/or fire barrier on the layers of insulation and inner panel of the fuselage of an aircraft.

FIG. 11 illustrates a first application of the present invention designed to enhance the survivability of commercial and military aircraft in the event of an uncontained turbine engine failure, impact of projectiles from any source, and/or fire. One or more layers of high strength and/or fire resistant fabric 24, 26, which together form the ballistic and/or fire barrier 27, are substantially fixedly positioned between the outer skin 12 and the inner panel 14 of the fuselage 10. The layers 24 plastically deform to absorb the kinetic energy of low-energy projectiles, which prevents the projectiles from penetrating the fuselage wall and then severing control lines, injuring passengers, or entering and exiting the fuselage 10 and damaging a second engine.

Constraints such as window positioning and points of coupling of the various components of the fuselage 10 requires that noncritical areas be left unprotected. Therefore, as shown in FIG. 11, the ballistic and/or fire barrier 27 can be positioned to slow or stop projectiles that strike the substantially open areas within the grid boundaries of the structure 16. Fire protection can also be enhanced in such locations. For example, smaller sized layers 24 may be coupled to the layer of insulation 18 to slow or stop projectiles that penetrate the fuselage 10 skin. Alternatively or in combination with the layers 24 coupled to the layers of insulation as an added measure of protection, larger sized layers 26 may be positioned toward or coupled to the inner panel 14 of the fuselage 10. Any projectile that breaches the smaller sized layers 24 strikes the larger sized layers 26 with greatly reduced energy.

Figure 12:
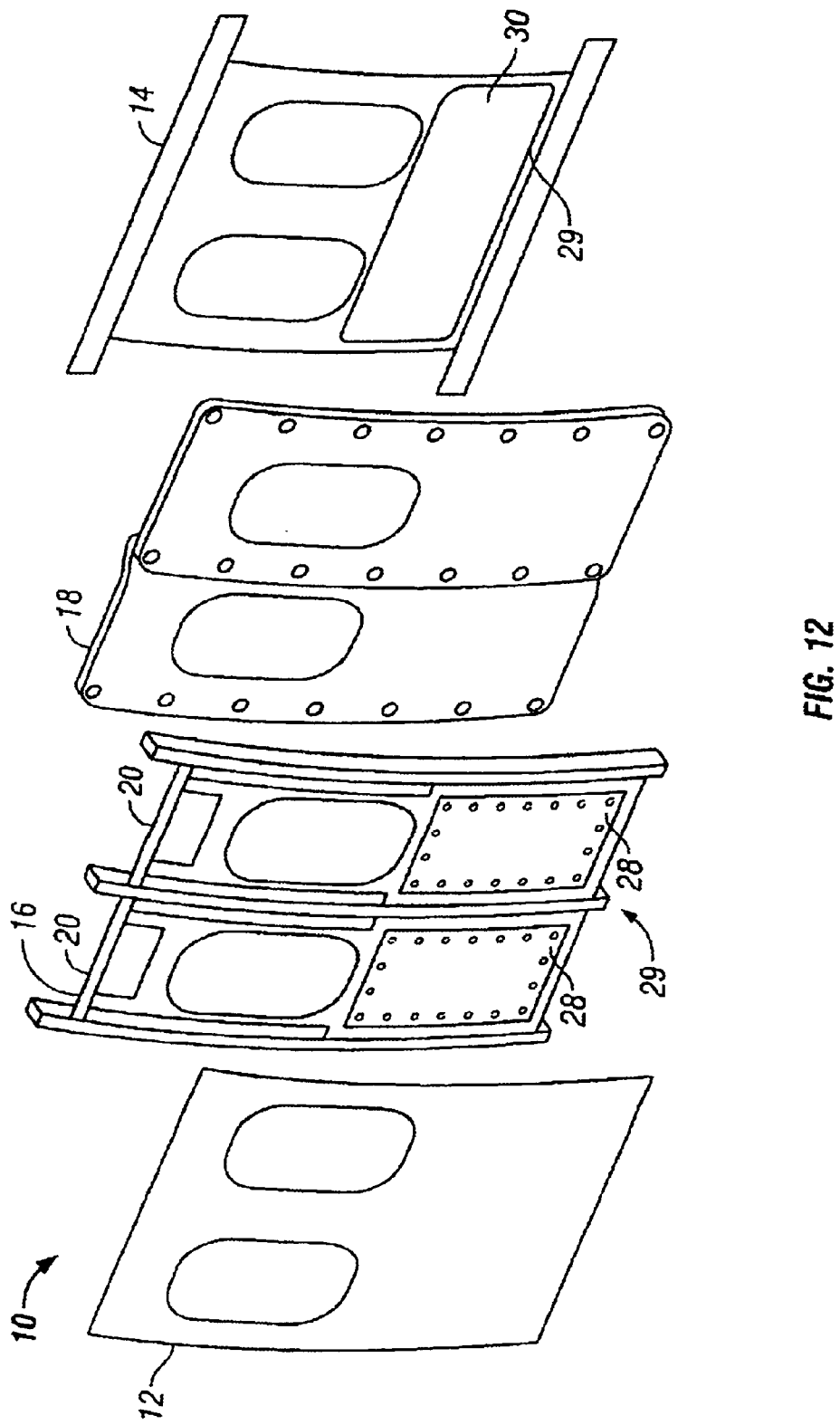
FIG. 12 illustrates a positioning of one or more layers of the ballistic and/or fire barrier on the structure of the fuselage of an aircraft.

FIG. 12 illustrates another embodiment of the present invention. Layers 28 of the ballistic and/or fire barrier 29 are attached to the frames 20 of the structure 16. The layers 28 can be positioned to cover the generally open areas of the frames 20. Projectiles striking the structural beams 22 of the structure 16 are slowed, stopped, or deflected. The layers 28 slow or stop projectiles attempting to pass through the substantially open spaces of the frames 20 of the structure 16.

In a configuration where the ballistic and/or fire barrier 29 is positioned between the outer skin 12 and layer of insulation 18 of the fuselage 10, as in the embodiment shown in FIG. 12, the layer or layers 28 of the ballistic and/or fire barrier 29 engage the projectile or resist a flame after it penetrates the outer skin 12 of the fuselage 10. The high tensile strength and cut resistant properties of the ballistic fabric resist penetration by the projectile, so that the layer or layers 28 of the ballistic and/or fire barrier along with the layer of insulation 18 are pulled in the direction of the projectile, their mass and bulk exerting drag loads on the projectile and slowing it. As the projectile contacts the inner panel 14 of the fuselage 10, it is slowed and has a blunted edge because of the fabric and insulation draped over it. The inner panel 14 resists the draped projectile and may stop its progress or be penetrated. In the later situation, the fabric and insulation will begin to be pulled through the hole in the inner panel 14, exerting additional drag as the draping 10 material is resisted by friction at the hole periphery. The projectile may be stopped after modest ingress into the passenger cabin, or in the case of a sufficiently energetic projectile, may continue with reduced velocity. The stopping power of the inner panel 14 may be enhanced as desired by coupling a layer or layers 30 of ballistic fabric to the outboard side of the inner panel 14.

Figure 13:
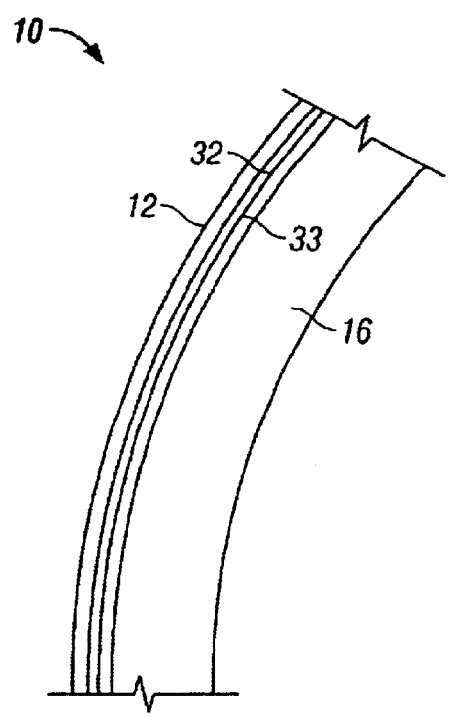
FIG. 13 illustrates a positioning of one or more layers of the ballistic and/or fire barrier towards the outer skin of the fuselage of an aircraft.

In FIG. 13 yet another embodiment of the present invention is illustrated. A layer or layers 32 of the ballistic and/or fire barrier 33 are positioned towards the outer skin 12 of the fuselage 10. This configuration provides greater protection to interior components of the aircraft, such as fuel and control lines. Further, this arrangement is especially adapted to provide resistance to projectile penetration and fire into nonpassenger portions of the aircraft which may or may not have inner panels 14 such as, for example, cargo areas and landing gear bay doors.

Figure 14:
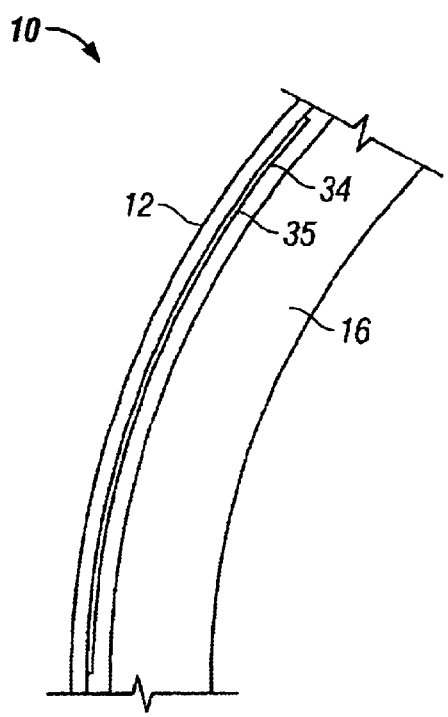
FIG. 14 illustrates a positioning of one or more layers of the ballistic and/or fire barrier coupled to the outer skin of the fuselage of an aircraft.

The ballistic and/or fire barrier may be substantially fixedly positioned with respect to the fuselage 10, or may be fixedly coupled to the components of the fuselage 10 such that it is fixedly positioned with respect to the outer skin 12 or structure 16. A layer 34 of the ballistic and/or fire barrier 35 may be detachably or fixedly coupled directly to the outer skin 12 of the fuselage 10 as shown in FIG. 14. An advantage of coupling the layers 34 of the ballistic and/or fire barrier 35 directly to the outer skin 12 of the fuselage 10 is to conserve the pressure boundary. Such an arrangement minimizes the areas of perforation and prevents widespread tearing of the outer skin 12. Alternatively, the layer 36 may be coupled to the frames 20 of the structure 16 as shown in FIG. 15. The layer 36 should be coupled to the structure 16 close to the outer skin 12 but separated from it by a small distance so as not to trap moisture against the outer skin 12 and cause corrosion.

In FIG. 16, a layer 38 of the ballistic and/or fire barrier 39 is positioned within an outer covering 40 of a layer of insulation 18 positioned towards the outer skin 12 of the fuselage 10 (i.e., with the layer 38 positioned towards the outer skin 12). This configuration has the advantage of preventing absorption of condensation by the layer 38. The outer covering 40 acts as a barrier to moisture that condenses on the various components of the fuselage 10. To obtain an additional increment of ballistic resistance, the outer covering 40 of the layer of insulation 18 could be one or more layers of a strong impervious-to-water material such as a bonded fiber layup.

Figure 17:
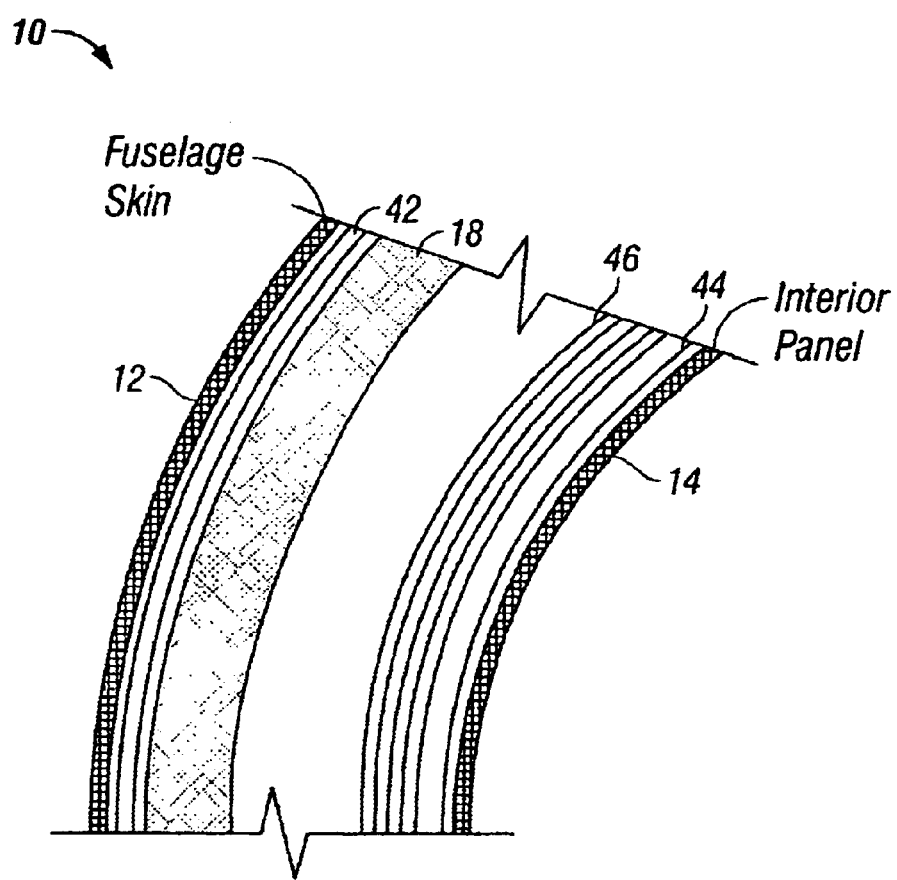
FIG. 17 illustrates a multi-layer embodiment of the present invention.

FIG. 17 illustrates a multi-layer embodiment of the present invention. Felt 42 is used in combination with a layer of high strength and/or fire resistant fiber layup 44. The felt 42 is positioned on an outer side of the layer of insulation 18. The layer of high strength and/or fire resistant fiber layup 44 is positioned adjacent the inner panel 14. If desired to stop fragments of high velocity which could penetrate both the felt 42 and the layer of high strength and/or fire resistant fiber layup 44, several layers of ballistic fabric 46 may be positioned between the layer of insulation 18 and the layer of high strength and/or fire resistant fiber layup 44. The felt 42 should be coupled to the structure 16 close to the outer skin 12 but separated from it by a small distance so as not to trap moisture against the outer skin 12 and cause corrosion.

There are several methods to substantially fixedly position the layers of the ballistic and/or fire barrier with respect to the fuselage 10. For example, the layers may be held in place by Friction such as being pinched between two components of the fuselage 10. One example would be positioning a layer between a layer of of the fuselage 10. Exemplary existing components of the fuselage 10 are the layer of insulation 18 and the inner panel 14. Their replacement with the ballistic and/or fire barrier thus requires the ballistic and/or fire barrier to provide adequate thermal insulation, acoustic insulation, flame resistance, moisture resistance, and aesthetics. From the standpoint of fire, three issues are critical: flammability, smoke production, and toxicity of the gas produced.

Aramid and PBO materials have moderate to high flame resistance, water absorption resistance, and thermal and acoustic insulation properties to serve as such building materials for multi purpose ballistic and/or fire barriers. Also, as aforementioned, polyethylene materials can be made sufficiently fire resistant through application of a flame retardant.

Figure 18:
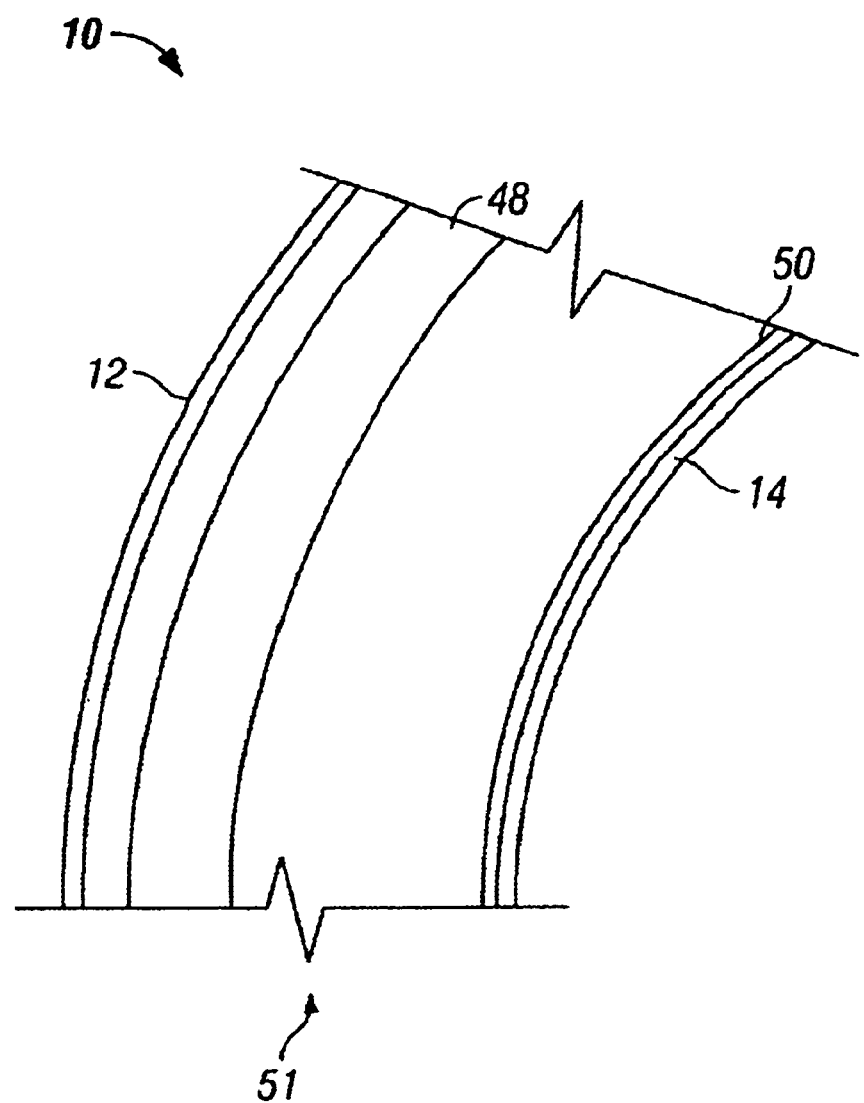
FIG. 18 illustrates a multi-layer embodiment of the present invention with felt replacing the layer of insulation.

As shown in FIG. 18, as an example, felt 48 replaces the current insulation material. It should be noted that the felt 48 can be used to replace only a portion of the insulation material as well. A layer of high strength and/or fire resistant material 50 may be positioned along the inner panel 14 of the fuselage. As another example, the inner panel 14 of the fuselage 10 may be constructed of a projectile resistant polymeric material, such as one or more of aramid, polyethylene, and PBO, so that the inner panel 14 forms part of the ballistic and/or fire barrier 51.

Figure 19:
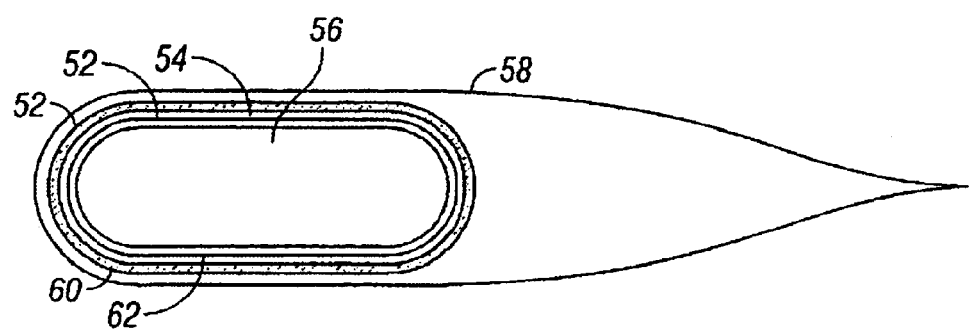
FIG. 19 illustrates how the ballistic and/or fire barrier may also be used to protect interior components of an aircraft such as a fuel tank.

The ballistic and/or fire barrier may also be used to protect interior components of an aircraft, especially in portions of the aircraft where moving parts makes attachment of the ballistic and/or fire barrier difficult or impossible. For example, in FIG. 19, the layers 52 of the ballistic and/or fire barrier 54 surrounds a fuel tank 56 in a wing 58 of the aircraft. In this exemplary embodiment, felt 60 may or may not surround a layer of ballistic material 62. A projectile striking the ballistic and/or fire barrier 54 would be slowed or stopped by the ballistic and/or fire barrier before striking the tank. In the event that the projectile does pierce the fuel tank 56, the felt 60 acts as an insulator to prevent the projectile from creating a spark that could ignite the fuel in the fuel tank 56 as well as helps slow leakage from the insulation 18 and the structure 16 of the fuselage 10 and pressing the insulation against the structure 16 such that the layer will not be substantially repositioned by vibration from travel or weight due to water absorption. In another example, a layer may be positioned inside an outer covering of the insulation between the outer covering and the insulating material, as discussed above. Also, corners and/or edges of the layers may be detachably coupled to an adjacent object. In any case, when only one or more layers of fabric are used, the layers should load the projectile as much as possible, but should break free of any coupling and be allowed to travel with the projectile before the projectile pierces the layers. The mass of the layers will continue to exert drag on the projectile. Further increasing the drag would be the friction exerted on the layers caused by the projectile dragging the layers through an aperture in an adjacent structure.

Alternatively, when used with a layer of felt, a layer of fabric may be fixedly coupled to the component of the fuselage 10 to which the layer is most closely positioned. An adhesive may be used to attach the layer to the components of the fuselage 10. Further, the layer may be coupled to the components of the fuselage 10 with fasteners. Irregardless of the method used to hold the layers in place, the layers should be held sufficiently in place so that they can absorb the energy of the projectile without being pulled along with the projectile more than is necessary to slow or stop the projectile. However, it should be noted that any layer of felt should be allowed to become detached from the fuselage 10 so that it may travel with the projectile, thus blunting the projectile and traveling with the projectile to continue to exert drag on the projectile even though the projectile pierces through the layer of fabric.

As an option, the added weight and cost of insertion of the ballistic and/or fire barrier may be minimized by replacing existing materials in the fuselage 10 wall with dual function ballistic materials. The ballistic and/or fire barrier may be constructed of materials having high specific boistic protection that can simultaneously perform the functions of, and perhaps replace, existing components newly created hole. Other exemplary internal components of the aircraft that could be protected include computers and other electronic equipment, hydraulics, and the like.

Figure 20:
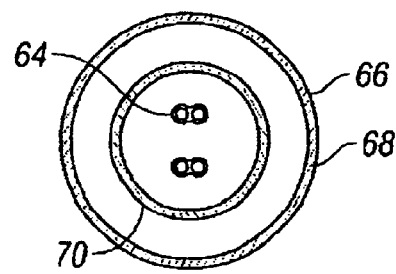
FIG. 20 illustrates how a component such as a control line disposed within the aircraft fuselage may be protected by wrapping at least one layer of the ballistic and/or fire barrier around the component.

FIG. 20 illustrates how a component 64 such as a control line disposed within the aircraft fuselage may be protected by wrapping at least one layer 66 of the ballistic and/or fire barrier 68 around the component 64. The high strength of the layer 66 helps prevent a projectile from piercing the outer covering 70 of the component 64. The layer 66 may be wrapped loosely around the component to urge deflection of an impacting projectile.

Figure 21:
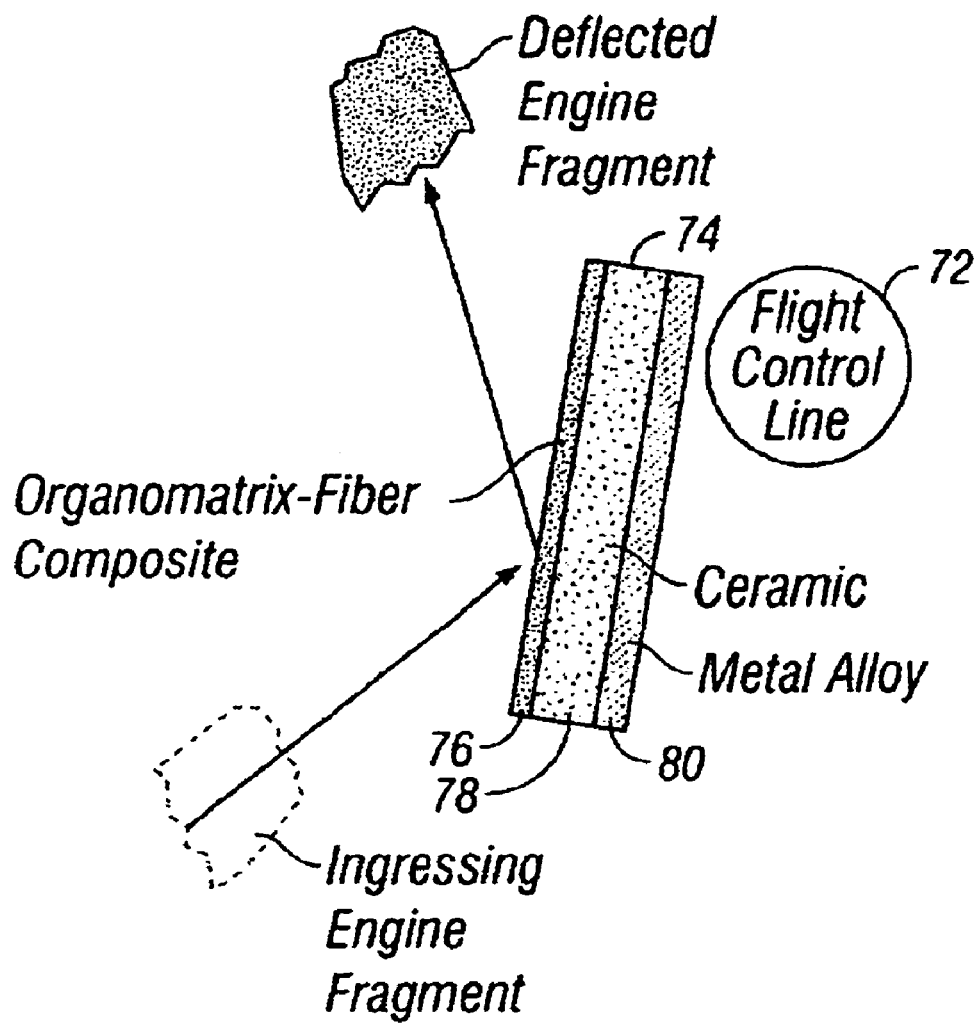
FIG. 21 illustrates an embodiment of the present invention to provide local protection to fuel and control lines.

FIG. 21 illustrates another embodiment of the present invention to provide local protection to inner components 72 of an aircraft, such as fuel and control lines. Fuel lines and flight control lines, whether hydraulic, mechanical, wire, or optical, are likely to be most efficiently protected by local ballistic and/or fire barriers 72 positioned near the line and in the path of the expected fragment trajectory. In such an embodiment, the ballistic and/or fire barrier 74 is constructed of one or more layers of a high strength material that are oriented at an incline relative to an anticipated line of motion of a projectile to deflect the projectile away from the component 72. Such a ballistic and/or fire barrier 74 could make use of existing aircraft structure, such as longerons, cargo bay floor, and baggage compartment, for mounting.

The high strength and/or fire resistant material should comprise a laminate of one or more of polymer material 76, ceramic material 78, and metal alloy 80. The polymer material 76 can be constructed in a weave, ply, or any other configuration. In an embodiment where the layer of high strength and/or fire resistant material comprises a laminate of polymer material 76 with a ceramic material 78 and/or metal alloy 80, the polymer material 76 should be positioned such that it will be struck by the projectile first. In an embodiment where the layer of high strength and/or fire resistant material comprises a laminate of ceramic material 78 and metal alloy 80, the ceramic material 78 should be positioned such that it will be struck by the projectile first. If all three materials are used, the ceramic material 78 should be positioned between the polymer material 76 and metal alloy 80.

FIG. 22 illustrates a ballistic and/or fire barrier 82 which protects objects such as occupants, components, cargo, etc. in an interior of a vehicle 84, such as a land, air, or sea vehicle, from damage or injury due to projectile penetration and/or fire. It must be stressed that the term "objects" as used herein can refer to occupants as well as other things sought to be protected. The ballistic and/or fire barrier 82 includes one or more layers of high strength and/or fire resistant fabric positioned towards an outer shell 86 of the vehicle. The layer or layers may be disposed in the interior of the vehicle 84 or may be positioned around a portion or all of the outside of the outer shell 86 of the vehicle 84. The high strength and/or fire resistant fabric is substantially fixedly or fixedly positioned with respect to the outer shell 86 of the vehicle 84 to prevent its sliding during travel and to create a load on an impacting projectile. If the vehicle 84 includes an inner panel 88, the layer of high strength and/or fire resistant fabric can be positioned between the outer shell 86 and an inside of the inner panel 88 of the vehicle 84 or towards an outside of the inner panel 88. It is to be understood that the material presented in the foregoing paragraphs with respect to the ballistic and/or fire barrier and its use with aircraft is also applicable to this and the following embodiments.

The vehicle 84 may be primarily designed for military applications, such as a tank, gunboat, or jet fighter for example. Alternatively, the vehicle 84 may be primarily designed for transporting passengers, such as a limousine, armored personnel carrier, etc. The vehicle 84 could also be primarily designed for transporting cargo, such as a supply truck.

Optionally, alone or in combination with a ballistic and/or fire barrier positioned towards the outer shell 86 of the vehicle 84, a layer of high strength and/or fire resistant fabric can be wrapped around at least one component disposed in the interior of the vehicle 84.

FIGS. 23 and 24 illustrate a ballistic and/or fire barrier 90 that protects objects (including occupants) in a structure 92 from damage or injury due to projectile penetration and/or fire. Such structures include, but are not limited to: buildings; containers such as cargo containers, suitcases, and food containers; etc; or any type of structure capable of partially or fully enclosing an object. The ballistic and/or fire barrier 90 includes at least one layer of high strength and/or fire resistant fabric positioned towards an outer housing 94 of the structure 92. The high strength and/or fire resistant fabric is substantially fixedly positioned with respect to the structure 92 towards either or both the inner surface 96 or outer surface 98 of the outer housing 94. It should be kept in mind that the ballistic and/or fire barrier 90 does not have to cover all of the outer case 94, but may only cover a portion of it, such as a portion of the outer housing 94 deemed most likely to be impacted by a projectile.

FIG. 23 depicts the ballistic and/or fire barrier 90 positioned towards the outer surface 98 of the structure 94. Such an embodiment aids in the prevention of the projectile piercing the structure 92 by loading the projectile as it impacts the structure, then blunting the object as it attempts to pierce the outer housing 94. Finally, the ballistic and/or fire barrier 90 will travel with the projectile if it pierces the outer housing 94, loading the projectile as the barrier 90 is slowed by friction as it is pulled through the hole in the outer housing 94. It should be kept in mind that the ballistic and/or fire barrier 90 may break free of the structure 92.

FIG. 24 illustrates the ballistic and/or fire barrier 90 positioned towards the inner surface 96 of the structure 94. Such an embodiment aids in the arrest of a projectile that penetrates the structure 92 or pieces of the outer housing 94 broken free by the projectile. Preferably, the ballistic and/or fire barrier 90 will break free of the inner surface 96 of the structure 92 before the projectile pierces the barrier 90 to blunt the projectile.

Figure 25:
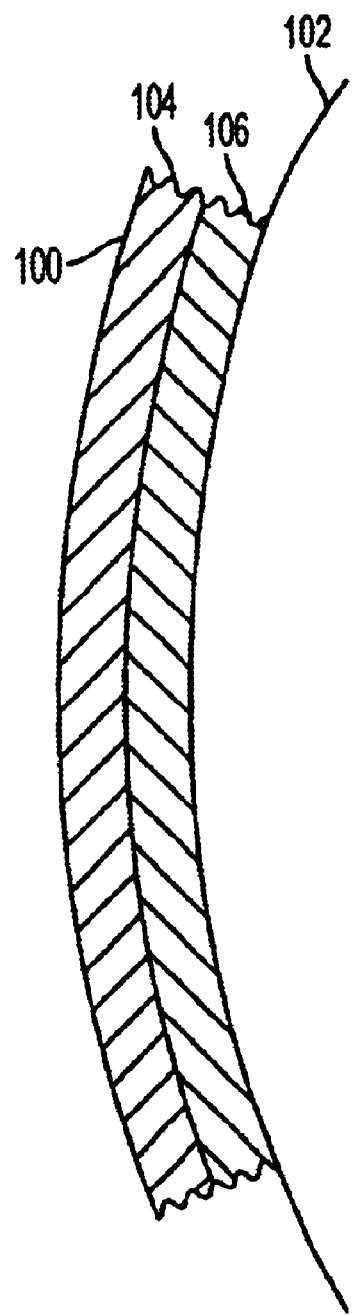
FIG. 25 illustrates a ballistic and/or fire barrier that protects a wearer of the barrier from damage due to projectile penetration and/or fire.

In yet another embodiment of the present invention, shown in FIG. 25, a ballistic and/or fire barrier 100 protects a wearer 102 of the ballistic and/or fire barrier 100 from damage due to projectile penetration and/or fire. The ballistic and/or fire barrier 100 comprises first and second portions 104,106 positioned generally parallel each other. The first portion 104 includes at least one layer of high strength and/or fire resistant fabric, of a type set forth above. The second portion 106 should have a high hardness to deflect, fracture, slow, stop or otherwise resist an impacting projectile. Preferably, the second portion 106 not only resists penetration by the projectile, but also spreads the shock of impact over a greater area of the wearer's body. Preferably, the first portion 104 is positioned between the wearer of the ballistic and/or fire barrier 100 and the second portion 106.

In all of the embodiments set forth herein, the fire barrier can be used interchangeably or in combination with the ballistic barrier. Furthermore, one layer of fabric, such as one made from aramid material and/or polybenzoxazole material, could provide both fire resistance and penetration resistance.

Although the invention is described herein with reference to several preferred embodiments, one skilled in the art will readily appreciate that permutations, substitution, additions and equivalents may be substituted for the embodiments set forth herein without departing from the spirit and scope of the present invention. It is therefore intended that the following appended claims be interpreted as including all such permutations, substitutions, additions, and equivalents as fall within the true spirit and scope of the present inventions.

What is claimed is:

1. A ballistic barrier preventing penetration by a foreign body in combination with an outer shell of an aircraft, the outer shell defining the interior of the aircraft, the ballistic barrier in combination with the outer shell comprising:

at least one layer of fabric disposed in the interior of the aircraft, wherein the at least one layer of fabric is capable of absorbing kinetic energy of the foreign body, the at least one layer of fabric being substantially positioned towards the interior of the aircraft with respect to the outer shell and at a finite distance away from the outer shell, and wherein the at least one layer of fabric is composed of one or more ballistic material selected from a group consisting of aramid, polyethylene and phenylenebenzole, and wherein the at least one layer of fabric includes at least two plies and wherein one of the plies is felt.

2. The ballistic barrier as recited in claim 1, wherein the felt being positioned outward of the remaining plies with respect to the interior.

3. The ballistic barrier as recited in claim 1, wherein at least one of the plurality of plies includes woven fibers.

4. The ballistic barrier as recited in claim 1, wherein the at least one layer of fabric is fire resistant.

5. The ballistic barrier as recited in claim 1, wherein the foreign body includes projectile or fragment munitions.

6. The ballistic barrier as recited in claim 1, wherein the aircraft includes an inner panel, and wherein the at least one layer of fabric is positioned between the outer shell and the inner panel of the aircraft.

7. A ballistic barrier in combination with an outer housing of a structure, the outer housing defining an interior, for protecting objects in the interior of the structure from damage, the ballistic barrier in combination with said outer housing comprising:

two or more layers of fabric disposed in the interior of the structure, the two or more layers of fabric being substantially positioned towards the outer housing of the structure and at a finite distance away from said outer housing of the structure, wherein at least one layer of fabric is capable of absorbing kinetic energy of a foreign body; and wherein a first of the two or more layers of fabric is a felt, the felt being positioned toward the outer housing of the structure with respect to the other layers of fabric.

8. The ballistic barrier as recited in claim 7, wherein at least one of the two or more layers of fabric is composed of one or more ballistic material selected from a group consisting of aramid, polyethylene and phenylenebenzole.

9. The ballistic barrier as recited in claim 7, wherein one of the two or more layers of fabric is fire resistant.

10. The ballistic barrier as recited in claim 7, wherein the structure includes a vehicle.

11. The ballistic barrier as recited in claim 7, wherein the structure includes an aircraft.

12. A method for protecting objects in an interior of a structure from damage, the structure having an outer shell defining the interior of the structure, the method comprising:

positioning at least one layer of fabric in the interior of the structure towards the outer shell of the structure and at a finite distance away from the outer shell, wherein the at least one layer of fabric is capable of absorbing a kinetic energy of a fragment or a projectile; and attaching the at least one layer of fabric to the structure such that the at least one layer of fabric is substantially positioned towards the interior of the structure with respect to the outer shell and at a finite distance away from the outer shell such that upon impact from the fragment or the projectile the fabric tends to detach from the structure, the at least one layer of fabric composed of one or more ballistic material selected from a group consisting of aramid, polyethylene and phenylenebenzole;

wherein the at least one layer of fabric includes a plurality of plies;

wherein one of the plurality of plies is a felt, the felt being positioned outward of the remaining plies with respect to the interior.

13. A ballistic fire barrier in combination with a vehicle, the vehicle having an outer shell defining an interior, the ballistic fire barrier in combination with the vehicle comprising:

two or more layers of fire resistant fabric disposed in the interior of the vehicle and substantially fixedly positioned towards the interior of the vehicle with respect to the outer shell of the vehicle and at a finite distance away from the outer shell, wherein a first of the two or more layers of fire resistant fabric is capable of absorbing kinetic energy of a fragment or a projectile and a second of the two or more layers of fire resistant fabric is a felt, the second layer being positioned outward of the first layer with respect to the interior of the vehicle.

14. The ballistic fire barrier as recited in claim 13, wherein at least one of the two or more layers of fire resistant fabric includes a plurality of plies.

15. The ballistic fire barrier as recited in claim 13, wherein at least one of the two or more layers of fire resistant fabric is composed of one or more ballistic material selected from a group consisting of aramid, polyethylene and phenylenebenzole.

16. The fire barrier as recited in claim 13, wherein the fire resistant fabric is detachably fixed to a frame disposed between the outer shell and an inner panel such that upon impact from the fragment or the projectile the fire resistant fabric tends to detach from the frame.

17. The ballistic fire barrier as recited in claim 13, wherein the vehicle includes an inner panel, and wherein the two or more layers of fire resistant fabric are positioned between the outer shell and the inner panel of the vehicle.

18. The ballistic fire barrier as recited in claim 13, wherein the vehicle is an aircraft.

19. A method for protecting objects in an interior of a vehicle from damage and injury, the vehicle having an outer shell defining the interior of the vehicle, the method comprising:

positioning at least one layer of fire resistant fabric in the interior of the vehicle towards the outer shell of the vehicle with respect to the interior of the vehicle;

attaching the at least one layer of fire resistant fabric to the vehicle such that the at least one layer of fire resistant fabric is substantially positioned at a finite distance away from the outer shell of the vehicle, the at least one layer of fabric capable of absorbing kinetic energy of a fragment or a projectile and composed of one or more ballistic material selected from a group consisting of aramid, polyethylene and phenylenebenzole, and wherein the at least one layer of fabric includes at least two plies and wherein one of the plies is felt; and wherein the vehicle is an aircraft.

20. A method for protecting objects in an interior of a vehicle from damage and injury, the vehicle having an outer shell defining the interior of the vehicle, the method comprising:

positioning at least one layer of fire resistant fabric in the interior of the vehicle towards the outer shell of the vehicle with respect to the interior of the vehicle;

attaching the at least one layer of fire resistant fabric to the vehicle such that the at least one layer of fire resistant fabric is substantially positioned at a finite distance away from the outer shell of the vehicle, the at least one layer of fabric capable of absorbing kinetic energy of a fragment or a projectile and composed of one or more ballistic material selected from a group consisting of aramid, polyethylene and phenylenebenzole; and wherein the at least one layer of fire resistant fabric includes two or more plies, a first of the two or more plies being a felt and a second of the two or more plies including woven fibers, the first of the two or more plies being positioned outward of the second of the two or more plies with respect to the interior of the vehicle.

* * * * *